United States Patent
Lam et al.

(10) Patent No.: US 12,085,717 B2
(45) Date of Patent: Sep. 10, 2024

(54) HYBRID WAVEGUIDE TO MAXIMIZE COVERAGE IN FIELD OF VIEW (FOV)

(71) Applicant: Meta Platforms Technologies, LLC, Menlo Park, CA (US)

(72) Inventors: Wai Sze Tiffany Lam, Lynnwood, WA (US); Yang Yang, Redmond, WA (US); Dominic Meiser, Bothell, WA (US); Wanli Chi, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 124 days.

(21) Appl. No.: 17/672,418

(22) Filed: Feb. 15, 2022

(65) Prior Publication Data
US 2023/0258937 A1    Aug. 17, 2023

(51) Int. Cl.
*G02B 27/01*    (2006.01)
*F21V 8/00*    (2006.01)

(52) U.S. Cl.
CPC ....... *G02B 27/0172* (2013.01); *G02B 6/0038* (2013.01); *G02B 6/0053* (2013.01); *G02B 2027/0118* (2013.01); *G02B 2027/0123* (2013.01); *G02B 2027/0178* (2013.01)

(58) Field of Classification Search
CPC .. G02B 27/0172; G02B 27/017; G02B 27/01; G02B 2027/0178; G02B 2027/0118; G02B 2027/0123; G02B 6/0038; G02B 6/0053
See application file for complete search history.

(56) References Cited

U.S. PATENT DOCUMENTS

| | | | |
|---|---|---|---|
| 6,285,813 B1 | 9/2001 | Schultz et al. | |
| 10,598,938 B1 | 3/2020 | Huang et al. | |
| 10,845,596 B2 | 11/2020 | Lee et al. | |
| 11,624,926 B1* | 4/2023 | Lam ................ | G02B 27/0093 345/8 |
| 2020/0076152 A1* | 3/2020 | Eichenholz ............ | G01S 17/42 |

(Continued)

FOREIGN PATENT DOCUMENTS

CN    113625386 A    * 11/2021
WO    WO-2020146451 A1 *  7/2020    ......... G02B 27/0081

OTHER PUBLICATIONS

International Search Report and Written Opinion for International Application No. PCT/US2023/013082, mailed Jun. 14, 2023, 10 pages.

(Continued)

*Primary Examiner* — Michelle R Connelly
*Assistant Examiner* — Mary A El-Shammaa
(74) *Attorney, Agent, or Firm* — Mannava & Kang, P.C.

(57) ABSTRACT

According to examples, a display system may include a wearable eyewear arrangement that may include a lens assembly having a projector to propagate display light associated with an image. The lens assembly may also include a waveguide for propagating the display light to an eyebox. The waveguide may include a combination of a volume Bragg grating (VBG) component and a partial reflective component that are oriented in a pre-determined configuration to reflect or propagate the display light to maximize a coverage in field of view (FOV) at the eyebox, while minimizing at least one of a ghost image or an intercepting optical lines pattern.

20 Claims, 19 Drawing Sheets

(56) References Cited

U.S. PATENT DOCUMENTS

| | | | |
|---|---|---|---|
| 2020/0117005 A1* | 4/2020 | Chi | G02B 27/0172 |
| 2020/0257065 A1 | 8/2020 | Chi et al. | |
| 2020/0356050 A1* | 11/2020 | Lane | G03H 1/26 |
| 2021/0055555 A1* | 2/2021 | Chi | G02B 27/4205 |
| 2021/0080721 A1 | 3/2021 | Geng et al. | |
| 2021/0223548 A1 | 7/2021 | Maimone et al. | |
| 2021/0223549 A1* | 7/2021 | Maimone | G02B 27/1086 |
| 2021/0278669 A1* | 9/2021 | Fabien | G02B 26/0833 |
| 2021/0364833 A1 | 11/2021 | Geng et al. | |
| 2022/0035159 A1* | 2/2022 | Koshelev | G03B 21/26 |
| 2022/0128746 A1* | 4/2022 | Chi | G02B 6/0016 |
| 2023/0133264 A1* | 5/2023 | Amirsolaimani | G02B 27/0093 |
| | | | 359/13 |
| 2023/0204959 A1* | 6/2023 | Yang | G02B 27/0172 |
| | | | 345/8 |
| 2023/0204967 A1* | 6/2023 | Yang | G02B 6/42 |
| | | | 385/37 |
| 2023/0209032 A1* | 6/2023 | Yang | H04N 13/128 |
| | | | 348/53 |
| 2023/0213761 A1* | 7/2023 | Lam | G02B 27/0081 |
| | | | 359/569 |

OTHER PUBLICATIONS

FDTD: "Understanding Direction Unit vector Coordinates in Far Field Projections," Ansys/Lumerical, 2021, 2 pages.

* cited by examiner

HYBRID WAVEGUIDE TO MAXIMIZE COVERAGE IN FIELD OF VIEW (FOV)

TECHNICAL FIELD

This patent application relates generally to display systems, and more specifically, to display systems that include a waveguide having a hybrid configuration to maximize coverage in field of view (FOV) while reducing, e.g., preventing or minimizing, an appearance of a ghost image and/or intercepting optical lines pattern at an eyebox.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

To facilitate delivery of this and other related content, service providers have endeavored to provide various forms of wearable display systems. One such example may be a head-mounted device (HMD), such as a wearable eyewear, a wearable headset, or eyeglasses. In some examples, the head-mounted device (HMD) may employ a first projector and a second projector to propagate a first image and a second image, respectively, to generate "binocular" vision for viewing by a user. However, it may be challenging to provide a higher coverage in the field of view. Further, it may be difficult to obtain high quality images due to formation of ghost images, spectral lines, etc.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1:
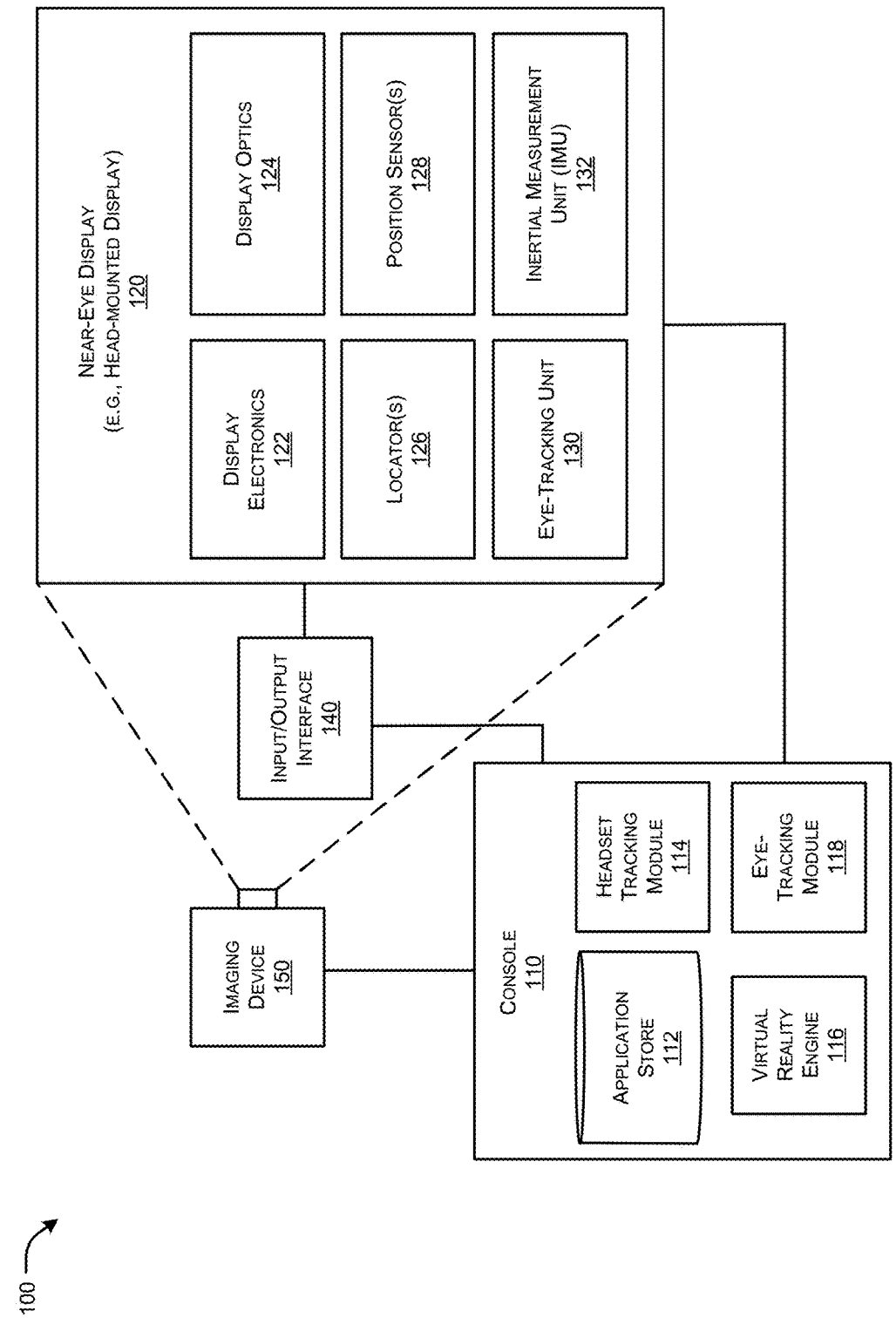
FIG. 1 illustrates a block diagram of an artificial reality system environment including a near-eye display, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

The systems and methods described herein may provide a display system (e.g., AR-based head-mounted device (HMD) or eyewear) including a waveguide for maximizing coverage in field of view (FOV). In some examples, the waveguide may include a combination of a volume Bragg grating (VBG) component and a partial reflective component. As used herein, "coverage" in FOV refers to an extent of an observable environment through a display system in an augmented reality (AR) environment. As used herein, a VBG may be a substantially and/or completely transparent optical device or component that may exhibit a periodic variation of refractive index. As used herein, a waveguide may be any optical structure that propagates a variety of signals (e.g., optical signals, electromagnetic waves, sound waves, etc.) in one or more directions. Employing principles of physics, information included in such signals, may be directed using any number of waveguides or similar components.

In general, display systems, such as, AR-based head-mounted devices and/or eyewear devices, which employ waveguides have multiplexed gratings or multiple VBGs to propagate light associated with an image from a projector to an eyebox. Such waveguides including multiple gratings may be limited in coverage in FOV and spectrum. For example, the FOV and the displayed image artifact corresponding to the display light may be small due to lack of coverage. In addition, in case of multiple sets of VBG, a corresponding Bragg condition pertaining to each VBG may be required to be satisfied. This in turn may lead to double or multiple Bragg filtering, thereby also leading to reduction in the overall coverage. In addition, the multiple Bragg filtering may also lead to formation of intercepting optical lines pattern, which may reduce the quality of the display image in the AR environment.

Further, stray light from a projector or one or more intermediary optical components of display systems may be propagated in such a way that it may lead to formation of a ghost image. In some examples, the ghost image may be a false image version of the image, an out-of-focus version of the image, a distorted version of the image, etc., or other type of artifact arising in propagation of light through multiplexed gratings. The appearance of the ghost image may affect the quality of the image displayed to a user and thus, may negatively impact a user's experience with such display systems. Furthermore, the user may experience poor visual acuity and significant visual discomfort, which often results in dizziness, eye fatigue, or other side effects.

The systems and methods disclosed herein may provide display systems in which the coverage in the FOV may be maximized, while the appearance of artifacts, such as ghost images and/or intercepting optical lines pattern may be reduced, e.g., prevented or minimized, on the display systems. The display systems (e.g., AR-based head-mounted device (HMD) or eyewear) described herein may include a wearable eyewear arrangement that includes a lens assembly. The lens assembly may include a projector for propagating display light associated with an image and a waveguide for propagating the display light to an eyebox. The display light may be associated with an image that may be viewable by a user of the display system as the image is displayed on the eyebox. The waveguide as described herein in the systems and methods may be a hybrid waveguide (also referred to as a "waveguide" or a "mixed waveguide"). The waveguide (or hybrid waveguide) may include a combination of a volume Bragg grating (VBG) component and a partial reflective component. The VBG component and the partial reflective component (such as, for example, a slant mirror) are oriented in a pre-determined configuration. The pre-determined configuration pertains to a particular arrangement of VBG component, partial reflective component and other components.

The pre-determined configuration may be customized based on requirements such that the waveguide may reflect or propagate the display light to maximize a coverage in a field of view (FOV) at the eyebox, while minimizing at least one of a ghost image or an intercepting optical lines pattern. It may be known that the VBG is responsive based on the Bragg's condition and may be wavelength dependent, and hence the VBG component may have a narrower spectral response than the partial reflective component. However, the combination of the VBG component and the partial reflective component may lead to an expected hybrid spectral response that may be broader than the spectral response of a single VBG component but narrower than the spectral response of the partial reflective component. This may lead to maximization of coverage in FOV, while mitigating undesired ghost image and/or intercepting optical lines pattern.

In some examples, at least one of the VBG component or the partial reflective component may be coupled with a prism coupler to allow a pre-determined diffraction or dispersion of the display light prior to a corresponding propagation of the display light through other components of the waveguide. In some examples, the prism coupler, the VBG component and/or the partial reflective component may be configured as either an input component, one or more middle components or an output component. Each component may reflect or propagate the display light to achieve the expected hybrid spectral response that maximizes the coverage in the FOV.

FIG. 1 illustrates a block diagram of an artificial reality system environment 100 including a near-eye display, according to an example. As used herein, a "near-eye display" may refer to a device (e.g., an optical device) that may be in close proximity to a user's eye. As used herein, "artificial reality" may refer to aspects of, among other things, a "metaverse" or an environment of real and virtual elements, and may include use of technologies associated with virtual reality (VR), augmented reality (AR), and/or mixed reality (MR). As used herein a "user" may refer to a user or wearer of a "near-eye display."

As shown in FIG. 1, the artificial reality system environment 100 may include a near-eye display 120, an optional external imaging device 150, and an optional input/output interface 140, each of which may be coupled to a console 110. The console 110 may be optional in some instances as the functions of the console 110 may be integrated into the near-eye display 120. In some examples, the near-eye display 120 may be a head-mounted display (HMD) that presents content to a user.

In some instances, for a near-eye display system, it may generally be desirable to expand an eyebox, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular HMD) or both eyes (for binocular HMDs). Also, as used herein, an "eyebox" may be a two-dimensional box that may be positioned in front of the user's eye from which a displayed image from an image source may be viewed.

In some examples, in a near-eye display system, light from a surrounding environment may traverse a "see-through" region of a waveguide display (e.g., a transparent substrate) to reach a user's eyes. For example, in a near-eye display system, light of projected images may be coupled into a transparent substrate of a waveguide, propagate within the waveguide, and be coupled or directed out of the waveguide at one or more locations to replicate exit pupils and expand the eyebox.

In some examples, the near-eye display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display 120 may be implemented in any suitable form-factor, including a HMD, a pair of glasses, or other similar wearable eyewear or device. Examples of the near-eye display 120 are further described below with respect to FIGS. 2 and 3. Additionally, in some examples, the functionality described herein may be used in a HMD or headset that may combine images of an environment external to the near-eye display 120 and artificial reality content (e.g., computer-generated images). Therefore, in some examples, the near-eye display 120 may augment images of a physical, real-world environment external to the near-eye display 120 with generated and/or overlaid digital content (e.g., images, video, sound, etc.) to present an augmented reality to a user.

In some examples, the near-eye display 120 may include any number of display electronics 122, display optics 124, and an eye-tracking unit 130. In some examples, the near-eye display 120 may also include one or more locators 126, one or more position sensors 128, and an inertial measurement unit (IMU) 132. In some examples, the near-eye display 120 may omit any of the eye-tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the display optics 124 may display image content optically (e.g., using optical waveguides and/or couplers) or magnify image light received from the display electronics 122, correct optical errors associated with the image light, and/or present the corrected image light to a user of the near-eye display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display 120. Examples of the one or more position sensors 128 may include any number of accelerometers, gyroscopes, magnetometers, and/or other motion-detecting or error-correcting sensors, or any combination thereof.

In some examples, the IMU 132 may be an electronic device that generates fast calibration data based on measurement signals received from the one or more position sensors 128. The one or more position sensors 128 may be located external to the IMU 132, internal to the IMU 132, or any combination thereof. Based on the one or more measurement signals from the one or more position sensors 128, the IMU 132 may generate fast calibration data indicating an estimated position of the near-eye display 120 that may be relative to an initial position of the near-eye display 120. For example, the IMU 132 may integrate measurement signals received from accelerometers over time to estimate a velocity vector and integrate the velocity vector over time to determine an estimated position of a reference point on the near-eye display 120. Alternatively, the IMU 132 may provide the sampled measurement signals to the optional console 110, which may determine the fast calibration data.

The eye-tracking unit 130 may include one or more eye-tracking systems. As used herein, "eye tracking" may refer to determining an eye's position or relative position, including orientation, location, and/or gaze of a user's eye. In some examples, an eye-tracking system may include an imaging system that captures one or more images of an eye and may optionally include a light emitter, which may generate light that is directed to an eye such that light reflected by the eye may be captured by the imaging system. In other examples, the eye-tracking unit 130 may capture reflected radio waves emitted by a miniature radar unit. These data associated with the eye may be used to determine or predict eye position, orientation, movement, location, and/or gaze.

In some examples, the near-eye display 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye-tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display 120 for presentation to the user in accordance with information received from one or more of external imaging device 150, the near-eye display 120, and the input/output interface 140. For example, in the example shown in FIG. 1, the optional console 110 may include an application store 112, a headset tracking module 114, a virtual reality engine 116, and an eye-tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optional console 110 may or may not be needed or the optional console 110 may be integrated with or separate from the near-eye display 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display 120 using slow calibration information from the external imaging device 150. For example, the headset tracking module 114 may determine positions of a reference point of the near-eye display 120 using observed locators from the slow calibration information and a model of the near-eye display 120. Additionally, in some examples, the headset tracking module 114 may use portions of the fast calibration information, the slow calibration information, or any combination thereof, to predict a future location of the near-eye display 120. In some examples, the headset tracking module 114 may provide the estimated or predicted future position of the near-eye display 120 to the virtual reality engine 116.

In some examples, the virtual reality engine 116 may execute applications within the artificial reality system environment 100 and receive position information of the near-eye display 120, acceleration information of the near-eye display 120, velocity information of the near-eye display 120, predicted future positions of the near-eye display 120, or any combination thereof from the headset tracking module 114. In some examples, the virtual reality engine 116 may also receive estimated eye position and orientation information from the eye-tracking module 118. Based on the received information, the virtual reality engine 116 may determine content to provide to the near-eye display 120 for presentation to the user.

In some examples, the eye-tracking module 118 may receive eye-tracking data from the eye-tracking unit 130 and determine the position of the user's eye based on the eye tracking data. In some examples, the position of the eye may include an eye's orientation, location, or both relative to the near-eye display 120 or any element thereof. So, in these examples, because the eye's axes of rotation change as a function of the eye's location in its socket, determining the eye's location in its socket may allow the eye-tracking module 118 to more accurately determine the eye's orientation.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

Figure 2:
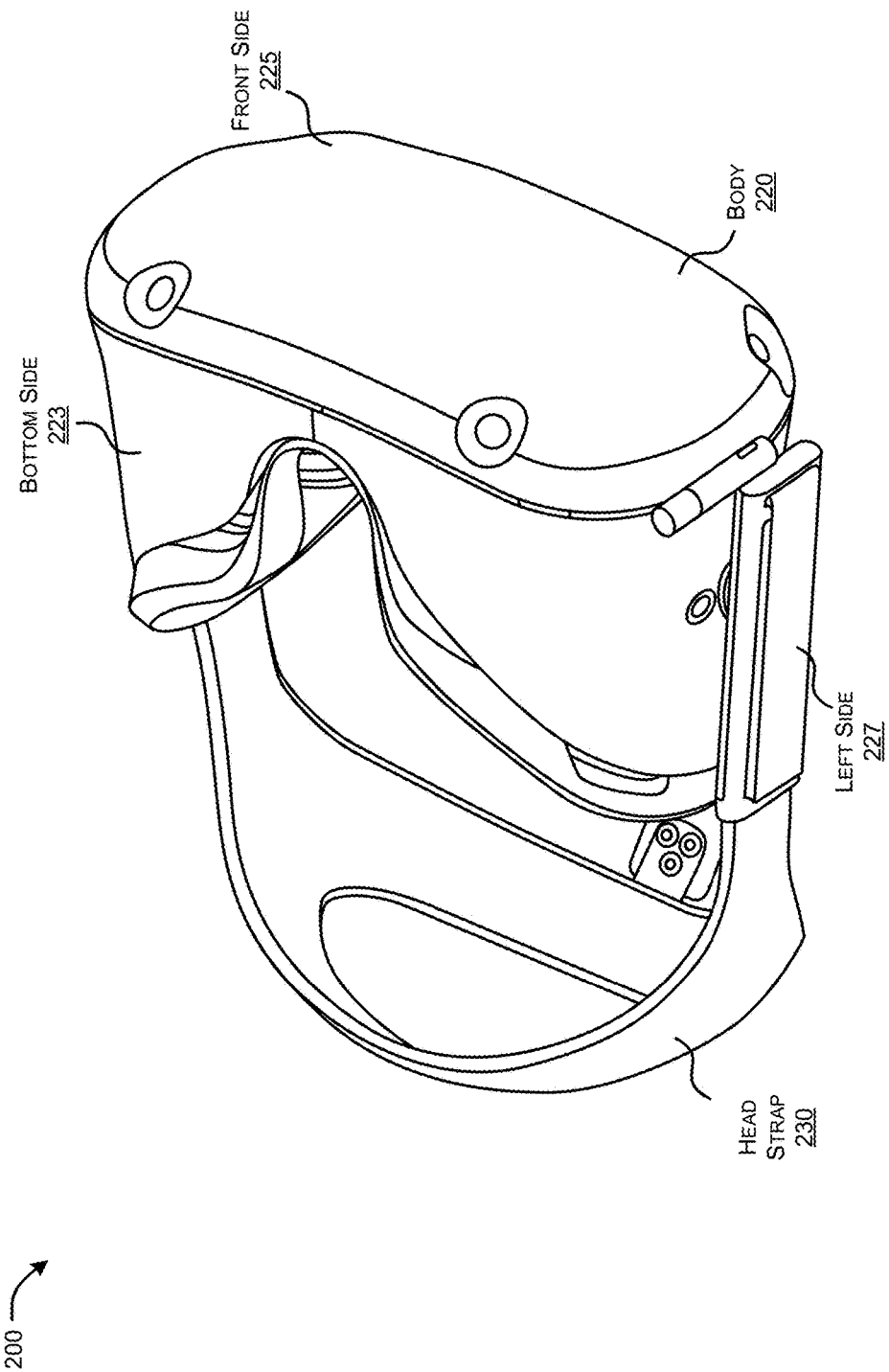
FIG. 2 illustrates a perspective view of a near-eye display in the form of a head-mounted display (HMD) device, according to an example.

FIG. 2 illustrates a perspective view of a near-eye display in the form of a head-mounted display (HMD) device 200, according to an example. In some examples, the HMD device 200 may be a part of a virtual reality (VR) system, an augmented reality (AR) system, a mixed reality (MR) system, another system that uses displays or wearables, or any combination thereof. In some examples, the HMD device 200 may include a body 220 and a head strap 230. FIG. 2 shows a bottom side 223, a front side 225, and a left side 227 of the body 220 in the perspective view. In some examples, the head strap 230 may have an adjustable or extendible length. In particular, in some examples, there may be a sufficient space between the body 220 and the head strap 230 of the HMD device 200 for allowing a user to mount the HMD device 200 onto the user's head. In some examples, the HMD device 200 may include additional, fewer, and/or different components.

In some examples, the HMD device 200 may present, to a user, media or other digital content including virtual and/or augmented views of a physical, real-world environment with computer-generated elements. Examples of the media or digital content presented by the HMD device 200 may include images (e.g., two-dimensional (2D) or three-dimensional (3D) images), videos (e.g., 2D or 3D videos), audio, or any combination thereof. In some examples, the images and videos may be presented to each eye of a user by one or more display assemblies (not shown in FIG. 2) enclosed in the body 220 of the HMD device 200.

In some examples, the HMD device 200 may include various sensors (not shown), such as depth sensors, motion sensors, position sensors, and/or eye tracking sensors. Some of these sensors may use any number of structured or unstructured light patterns for sensing purposes. In some examples, the HMD device 200 may include an input/output interface 140 for communicating with a console 110, as described with respect to FIG. 1. In some examples, the HMD device 200 may include a virtual reality engine (not shown), but similar to the virtual reality engine 116 described with respect to FIG. 1, that may execute applications within the HMD device 200 and receive depth information, position information, acceleration information, velocity information, predicted future positions, or any combination thereof of the HMD device 200 from the various sensors.

In some examples, the information received by the virtual reality engine 116 may be used for producing a signal (e.g., display instructions) to the one or more display assemblies. In some examples, the HMD device 200 may include locators (not shown), but similar to the virtual locators 126 described in FIG. 1, which may be located in fixed positions on the body 220 of the HMD device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

It should be appreciated that in some examples, a projector mounted in a display system may be placed near and/or closer to a user's eye (i.e., "eye-side"). In some examples, and as discussed herein, a projector for a display system shaped liked eyeglasses may be mounted or positioned in a temple arm (i.e., a top far corner of a lens side) of the eyeglasses. It should be appreciated that, in some instances, utilizing a back-mounted projector placement may help to reduce size or bulkiness of any required housing required for a display system, which may also result in a significant improvement in user experience for a user.

Figure 3:
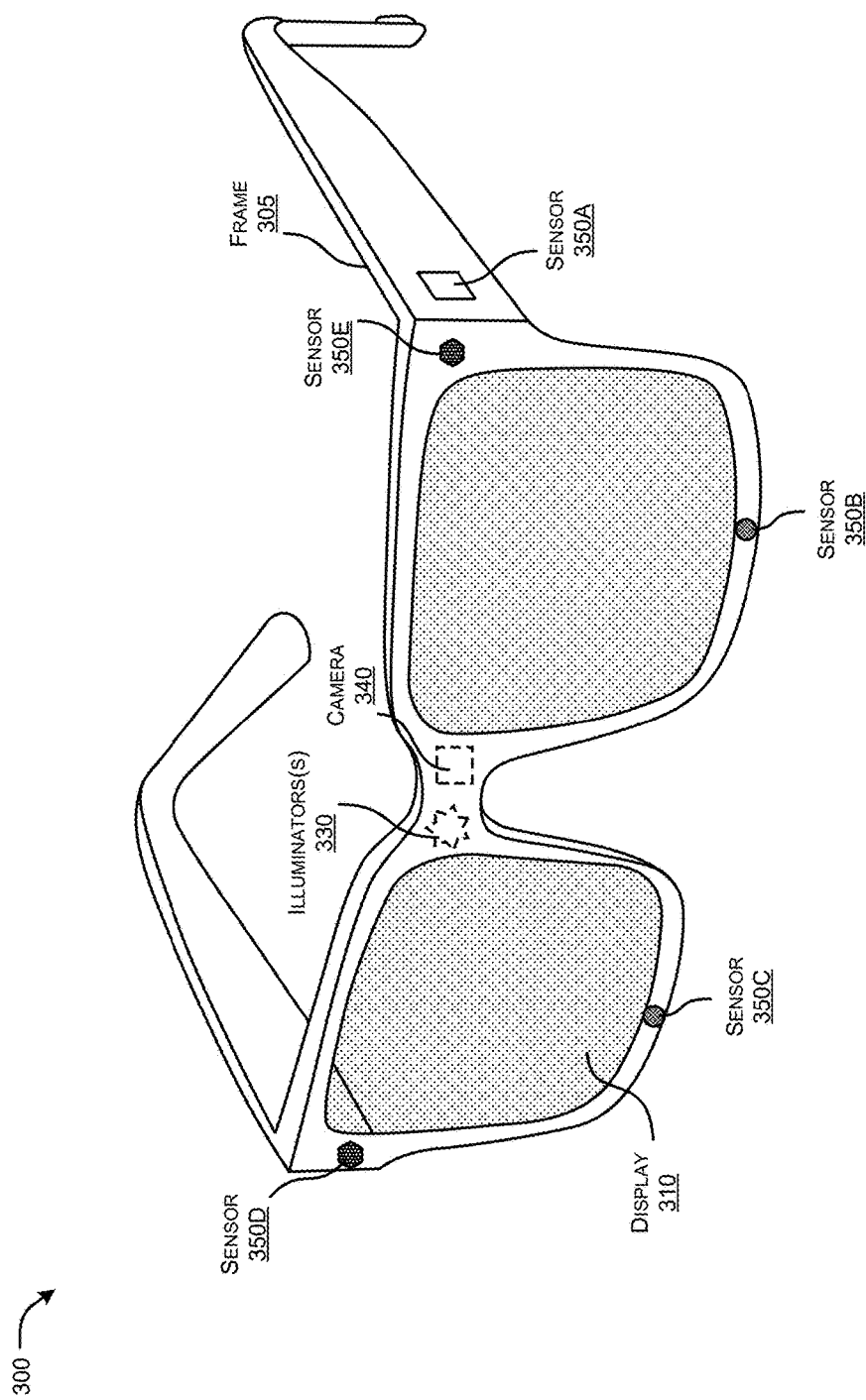
FIG. 3 is a perspective view of a near-eye display in the form of a pair of glasses, according to an example.

FIG. 3 is a perspective view of a near-eye display 300 in the form of a pair of glasses (or other similar eyewear), according to an example. In some examples, the near-eye display 300 may be a specific implementation of near-eye display 120 of FIG. 1, and may be configured to operate as a virtual reality display, an augmented reality display, and/or a mixed reality display.

In some examples, the near-eye display 300 may include a frame 305 and a display 310. In some examples, the display 310 may be configured to present media or other content to a user. In some examples, the display 310 may include display electronics and/or display optics, similar to components described with respect to FIGS. 1-2. For example, as described above with respect to the near-eye display 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc.

In some examples, the near-eye display 300 may further include various sensors 350A, 350B, 350C, 350D, and 350E on or within a frame 305. In some examples, the various sensors 350A-350E may include any number of depth sensors, motion sensors, position sensors, inertial sensors, and/or ambient light sensors, as shown. In some examples, the various sensors 350A-350E may include any number of image sensors configured to generate image data representing different fields of views in one or more different directions. In some examples, the various sensors 350A-350E may be used as input devices to control or influence the displayed content of the near-eye display 300, and/or to provide an interactive virtual reality (VR), augmented reality (AR), and/or mixed reality (MR) experience to a user of the near-eye display 300. In some examples, the various sensors 350A-350E may also be used for stereoscopic imaging or other similar application.

In some examples, the near-eye display 300 may further include one or more illuminators 330 to project light into a physical environment. The projected light may be associated with different frequency bands (e.g., visible light, infra-red light, ultra-violet light, etc.), and may serve various purposes. In some examples, the one or more illuminators 330 may be used as locators, such as the one or more locators 126 described above with respect to FIGS. 1-2.

In some examples, the near-eye display 300 may also include a camera 340 or other image capture unit. The camera 340, for instance, may capture images of the physical environment in the field of view. In some instances, the captured images may be processed, for example, by a virtual reality engine (e.g., the virtual reality engine 116 of FIG. 1) to add virtual objects to the captured images or modify physical objects in the captured images, and the processed images may be displayed to the user by the display 310 for augmented reality (AR) and/or mixed reality (MR) applications.

Figure 4:
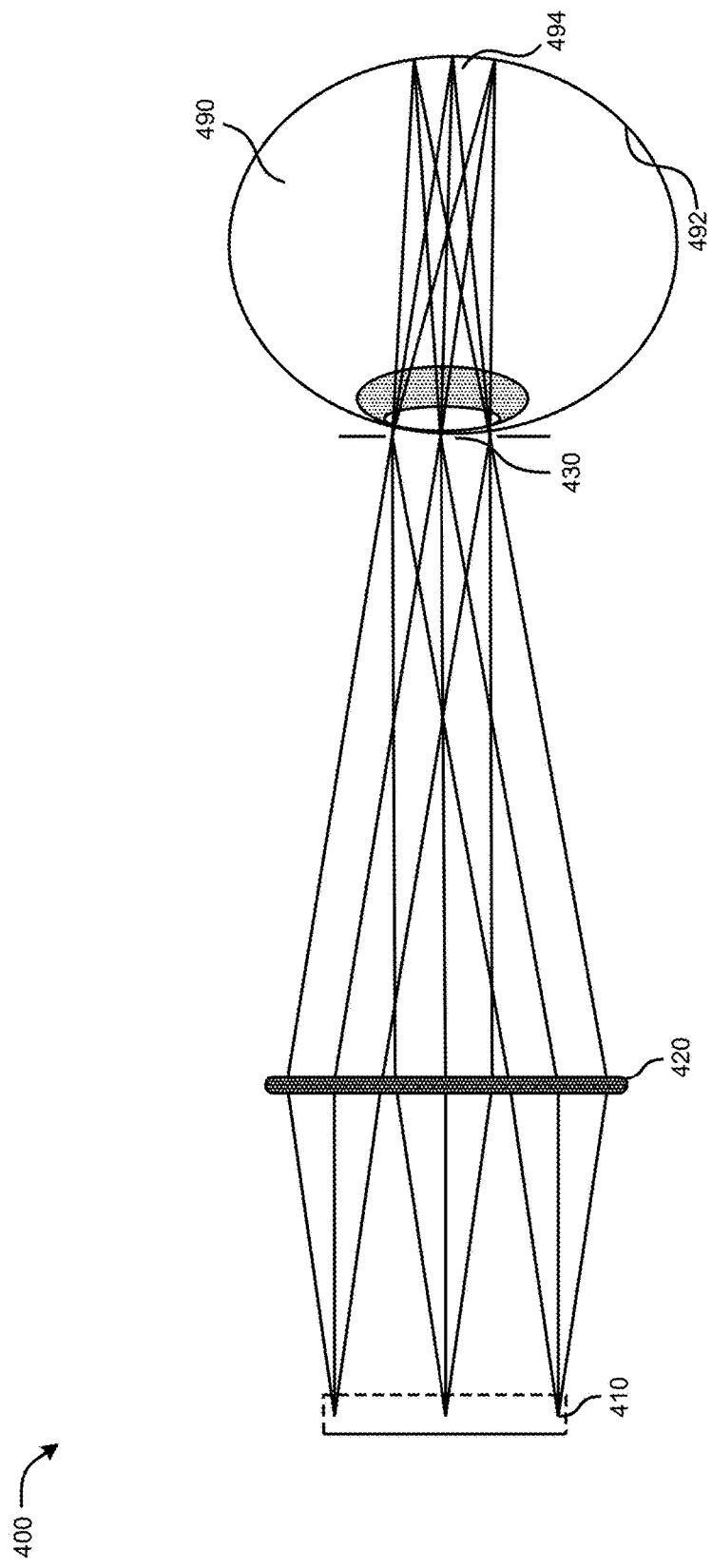
FIG. 4 illustrates a schematic diagram of an optical system in a near-eye display system, according to an example.

FIG. 4 illustrates a schematic diagram of an optical system 400 in a near-eye display system, according to an example. In some examples, the optical system 400 may include an image source 410 and any number of projector optics 420 (which may include waveguides having gratings as discussed herein). In the example shown in FIG. 4, the image source 410 may be positioned in front of the projector optics 420 and may project light toward the projector optics 420. In some examples, the image source 410 may be located outside of the field of view (FOV) of a user's eye 490. In this case, the projector optics 420 may include one or more reflectors, refractors, or directional couplers that may deflect light from the image source 410 that is outside of the field of view (FOV) of the user's eye 490 to make the image source 410 appear to be in front of the user's eye 490. Light from an area (e.g., a pixel or a light emitting device) on the image source 410 may be collimated and directed to an exit pupil 430 by the projector optics 420. Thus, objects at different spatial locations on the image source 410 may appear to be objects far away from the user's eye 490 in different viewing angles (i.e., fields of view (FOV)). The collimated light from different viewing angles may then be focused by the lens of the user's eye 490 onto different locations on retina 492 of the user's eye 490. For example, at least some portions of the light may be focused on a fovea 494 on the retina 492. Collimated light rays from an area on the image source 410 and incident on the user's eye 490 from a same direction may be focused onto a same location on the retina 492. As such, a single image of the image source 410 may be formed on the retina 492.

In some instances, a user experience of using an artificial reality system may depend on several characteristics of the optical system, including field of view (FOV), image quality (e.g., angular resolution), size of the eyebox (to accommodate for eye and head movements), and brightness of the light (or contrast) within the eyebox. Also, in some examples, to create a fully immersive visual environment, a large field of view (FOV) may be desirable because a large field of view (FOV) (e.g., greater than about 60°) may provide a sense of "being in" an image, rather than merely viewing the image. In some instances, smaller fields of view may also preclude some important visual information. For example, a head-mounted display (HMD) system with a small field of view (FOV) may use a gesture interface, but users may not readily see their hands in the small field of view (FOV) to be sure that they are using the correct motions or movements. On the other hand, wider fields of view may require larger displays or optical systems, which may influence the size, weight, cost, and/or comfort of the head-mounted display (HMD) itself.

In some examples, a waveguide may be utilized to couple light into and/or out of a display system. In particular, in some examples and as described further below, light of projected images may be coupled into or out of the waveguide using any number of reflective or diffractive optical elements, such as gratings. For example, as described further below, VBGs, partial reflective components, prism couplers and other such components may be utilized in a waveguide-based, back-mounted display system (e.g., a pair of glasses or similar eyewear).

In some examples, combination of VBGs, partial reflective components and/or prism couplers may be used to diffract display light from a projector to a user's eye. Furthermore, in some examples, the VBGs, partial reflective components and/or prism couplers may also help compensate for any dispersion of display light caused by each other to reduce the overall dispersion in a waveguide-based display system.

Figure 5:
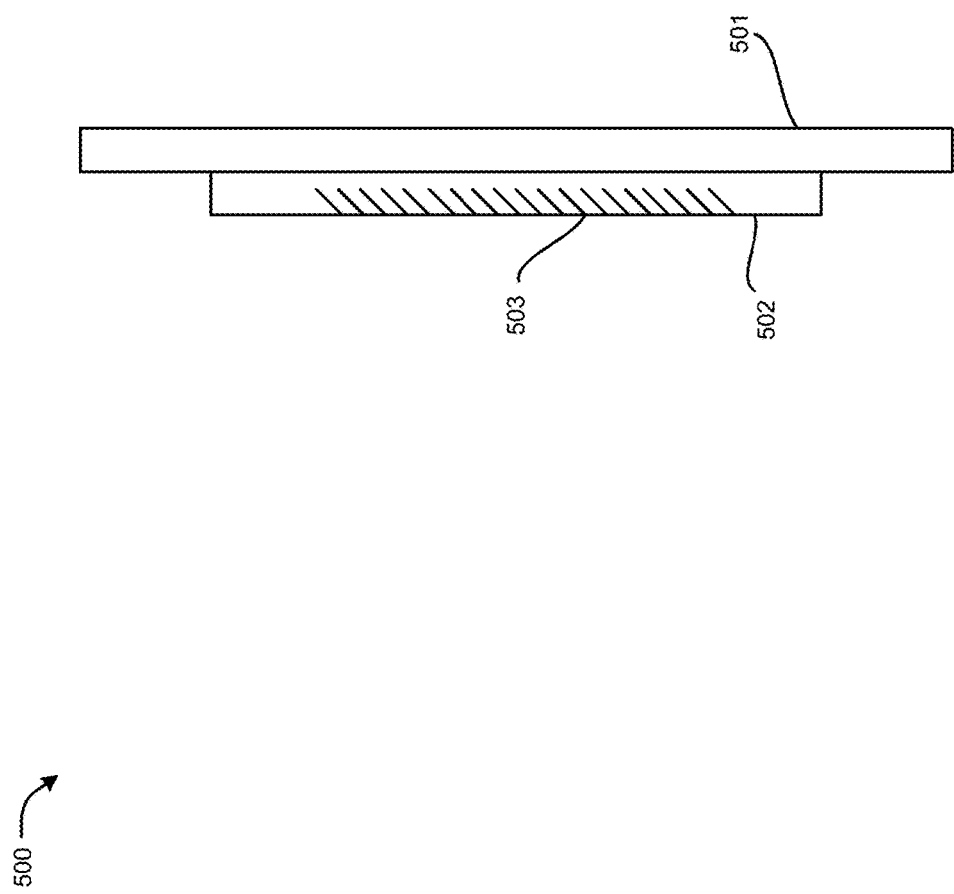
FIG. 5 illustrates a diagram of a waveguide, according to an example.

FIG. 5 illustrates a diagram of a waveguide configuration 500, according to an example. In some examples, the waveguide configuration 500 may include a plurality of layers, such as at least one substrate 501 and at least one photopolymer layer 502. In some examples, the substrate 501 may be a comprised of a polymer or glass material. In some examples, the photopolymer layer 502 may be transparent or "see-through", and may include any number of photosensitive materials (e.g., a photo-thermo-refractive glass) or other similar material.

In some examples, the at least one substrate 501 and the at least one photopolymer layer 502 may be optically bonded (e.g., glued on top of each other) to form the waveguide configuration 500. In some examples, the overall thickness of the waveguide may be in the range of 0.1-1.6 millimeters (mm) or other thickness range. In some examples, the photopolymer layer 502 may be a film layer having a thickness of anywhere between about 10 to 100 micrometers (μm) or other range.

In some examples, the VBGs, the partial reflective components and/or prism couplers may be provided in (or exposed into) the photopolymer layer 502. That is, in some examples, VBGs, partial reflective components and/or prism couplers may be exposed by generating an interference pattern 503 into the photopolymer layer 502. In some examples, the interference pattern 503 may be generated by superimposing two lasers to create a spatial modulation that may generate the interference pattern 503 in and/or throughout the photopolymer layer 502. In some examples, the interference pattern 503 may be a sinusoidal pattern. Also, in some examples, the interference pattern 503 may be made permanent via a chemical, optical, mechanical, or other similar process.

By exposing the interference pattern 503 into the photopolymer layer 502, for example, the refractive index of the photopolymer layer 502 may be altered and the VBGs, the partial reflective components and/or prism couplers may be provided in the photopolymer layer 502. It should also be appreciated that other various techniques to provide VBGs, partial reflective components and/or prism couplers in or on the photopolymer layer 502 may also be provided.

Figure 6A:
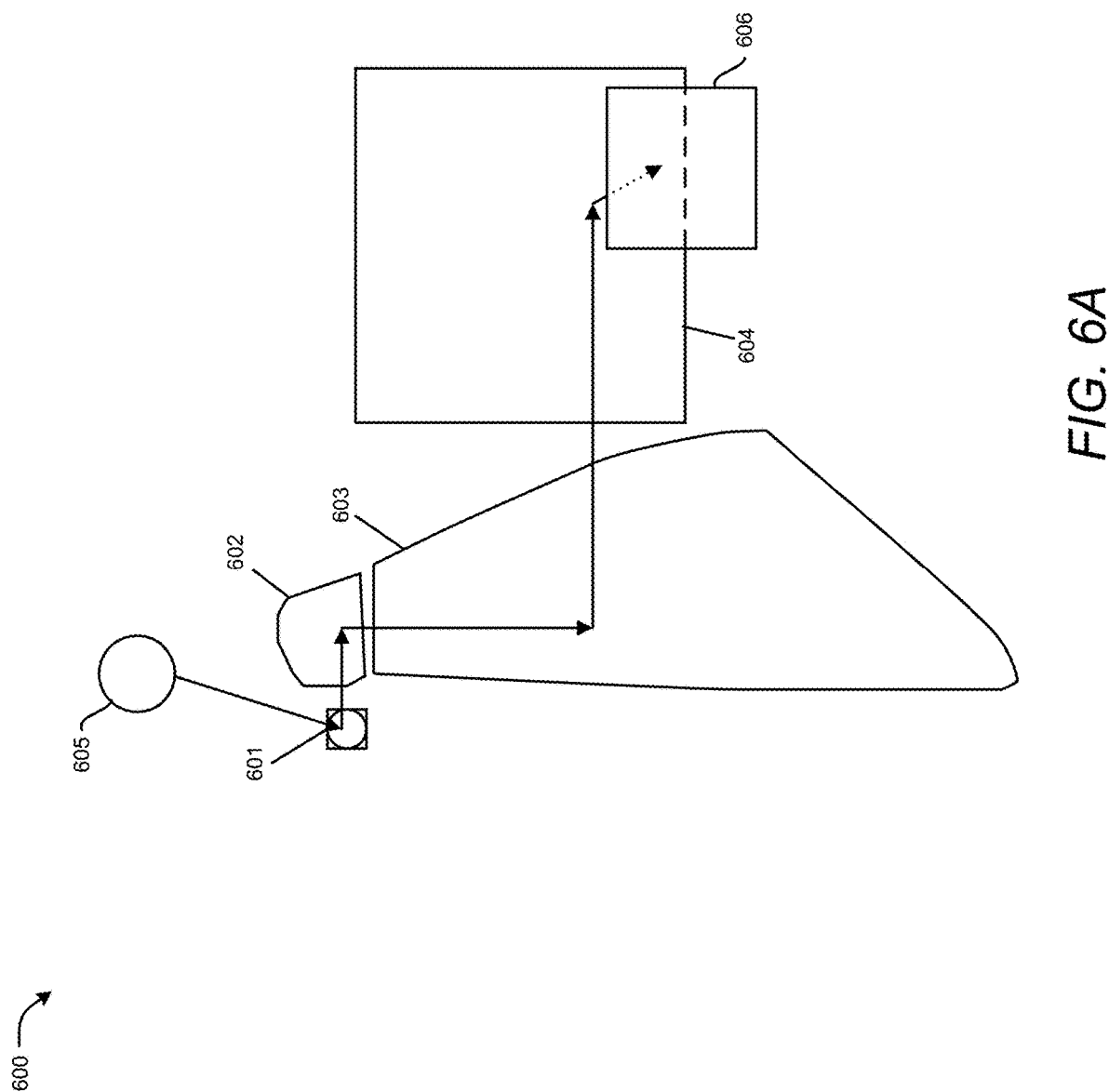
FIG. 6A illustrates a diagram of a typical waveguide configuration, according to an example.

FIG. 6A illustrates a diagram of a typical waveguide configuration 600 used in a display system. The waveguide configuration 600, as shown, may include an input component 601, a first middle component (or first component M1) 602, a second middle component (or second component M2) 603, and an output component 604. In a typical configuration, a projector 605 of the display system may transmit display light (indicated by an arrow) to waveguide configuration 600, starting with the input component 601 (which receives the display light from the projector). The display light is then reflected to the first middle component 602 and the second middle component 603, and then to the output component 604 which propagates the display light to an eyebox or a user's eye 606.

In a typical configuration, when all components i.e. input component 601, the first middle component 602, the second middle component 603, and the output component 604 may be VBGs, the display light may be subject to multiple Bragg's filtering steps. This may be due to varying grating vector characteristics of the components of the grating. For example, in waveguide configurations having same grating direction vector for input and output components 601 and 604, and same grating direction vector for middle components 602 and 603, double Bragg filtering steps may be involved as the grating vector changes between the mentioned components. In general, display light may be propagated based on fulfillment of Bragg's condition pertaining to the VBGs and may be wavelength dependent. Considering the same example as provided hereinabove, in a typical waveguide having two sets of VBGs (with varying grating vector), light (or display light) may need to match both Bragg conditions to pass to the eyebox. Not only does this limitation decrease the reflective response (and coverage), but also multiple instances of Braggs filtering may lead to formation of intercepting optical lines pattern or undesired stripes, which may negatively affect the quality of the displayed image at the eyebox. The systems and methods described herein implement a combination of VBGs and partial reflective component to address this concern, which will be clear from the embodiments described in FIGS. 7A-7E.

Figure 6B:
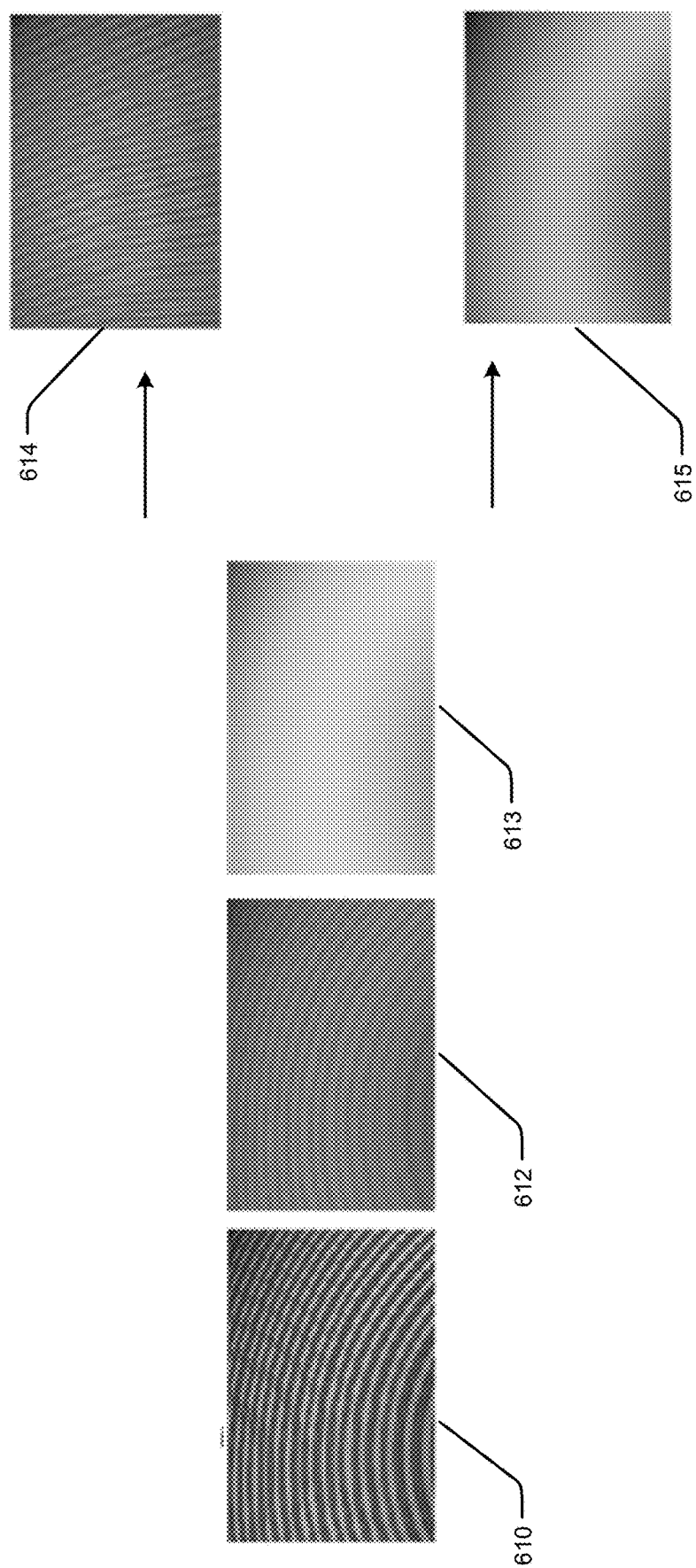
FIG. 6B illustrates various comparative examples of optical lines pattern observed in display systems configured with a conventional volume Bragg gratings (VBG) configuration and hybrid waveguide configuration, according to an example.

FIG. 6B illustrates comparative examples showing variation in intercepting optical lines pattern observed in display systems configured with conventional waveguide configuration (including multiple sets of VBGs with varying grating vector as explained in FIG. 6A) and hybrid waveguide configuration (including VBG component and partial reflective component), according to an example. As illustrated in FIG. 6B, for a series of Bragg peaks provided by a series of grating pitches, image in 610 displays optical lines pattern observed in a single Bragg filtering pertaining to a single wavelength obtained after propagation of display light through a first Bragg filter (first VBG component). Further, images in 612 and 613 display optical lines pattern in a single Bragg filtering (i.e. first VBG component), pertaining to 10 nm bandwidth and 30 nm bandwidth respectively. Further, the image 614 shows intercepting optical lines pattern at 30 nm bandwidth after double Bragg filtering that may occur when the display light propagates through a second Bragg grating (or second VBG component) having a different grating direction vector compared to the first Bragg grating. The representation shown in 614, illustrates an outcome of varying spectral characteristics associated with an arrangement of typical VBG based waveguide (having multiple VBGs with different grating direction vector). As seen in 614, the optical pattern may show a set of vertical lines that may correspond to a first arrangement of VBGs (e.g., an in-coupling VBG) and a set of horizontal lines may correspond to a second arrangement of VBGs (e.g., a middle VBG). As further seen in 612, light that may meet a Bragg condition (i.e., resonances) for both the first arrangement of gratings and the second arrangement of gratings may be represented by an intersection of a vertical line (from the set of vertical lines) and a horizontal line (from the set of horizontal lines). In some instances, this may represent light that may be "used", wherein the used light may correspond to one or more portions (e.g., dots) of a display being illuminated. Furthermore, in this example, light that may be represented on a line in between two intersections may not travel through and out of the waveguide (i.e., "unused" light). In addition, in this example, light that may be represented as not on a line (i.e., in between vertical lines and horizontal lines) may not travel through and out of the waveguide (i.e., "unused" light) as well. In some instances, this may correspond to light that may be "unused", wherein the unused light may manifest as one or more dark areas in between portions (e.g., in the form of stripes/lines/dots) of a display that may be illuminated. This may lead to wastage of a majority of source light. It may be observed that at 30 nm bandwidth, the image 614 displays a series of undesired stripes/lines appearing at each intersection of two sets of Braggs curve in the intercepting optical lines patterns. The appearance of the intercepting optical lines pattern i.e. undesired stripes/dark areas may affect the overall quality of the displayed image in the FOV thus leading to drop in quality of user experience. In an embodiment, using hybrid waveguide configuration as described herein, the optical lines pattern, the undesired stripes/lines is avoided as seen in image 615. This is achieved as the VBG components used in the present configurations include same type of VBG grating vector. For example, the waveguide configurations as described herein may include same grating vectors for input grating and the output grating, and same grating vectors for the middle gratings, wherein one set of gratings (either input/output grating or middle gratings) may be VBG components and the other set may be partial reflective components and/or prism. This prevents double Bragg filtering and the resulting undesired stripes (as observed in image 615) by avoiding the need to pass display light through two different sets of grating having different grating vector.

Further, spectral response (such as reflective or transmissive response) of VBGs may be narrow due to corresponding Bragg's condition and wavelength dependency, thus also impacting the coverage in FOV. The spectral response may include at least one of a reflective response or a transmissive response. The systems and methods described herein are able to obtain broader spectral response than VBG by combining the VBG with partial reflective surfaces (such as slant mirror). This is because the partial reflective surfaces tend to have a broader spectral response than that of VBG.

Figure 6C:
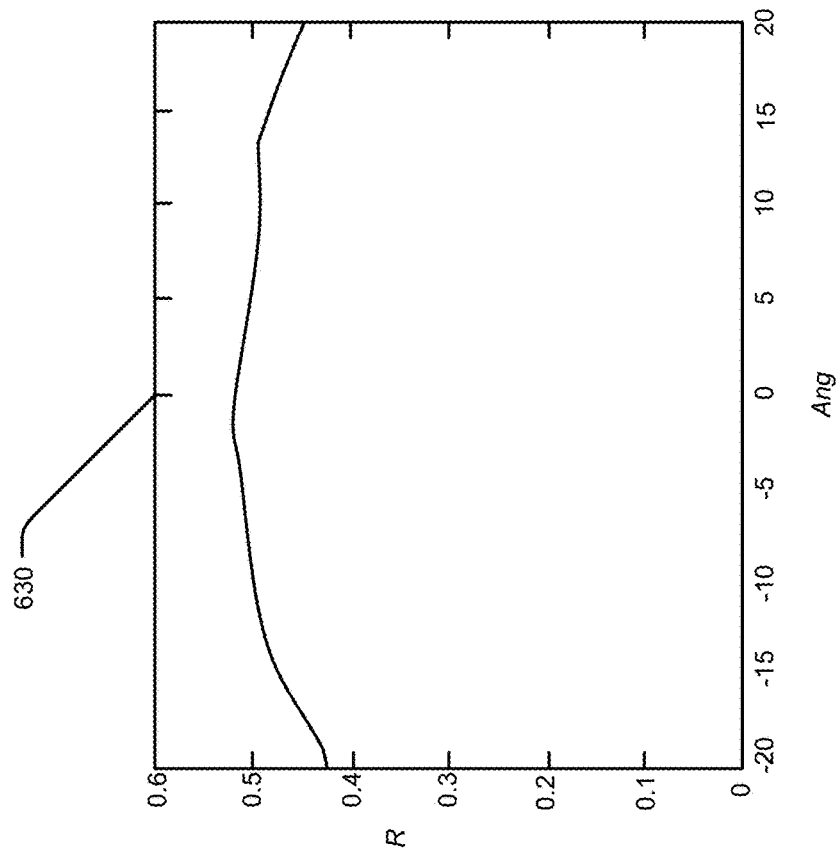
FIG. 6C illustrates spectral response characteristics of a single VBG component and a slant mirror, according to an example.
Figure 6C:
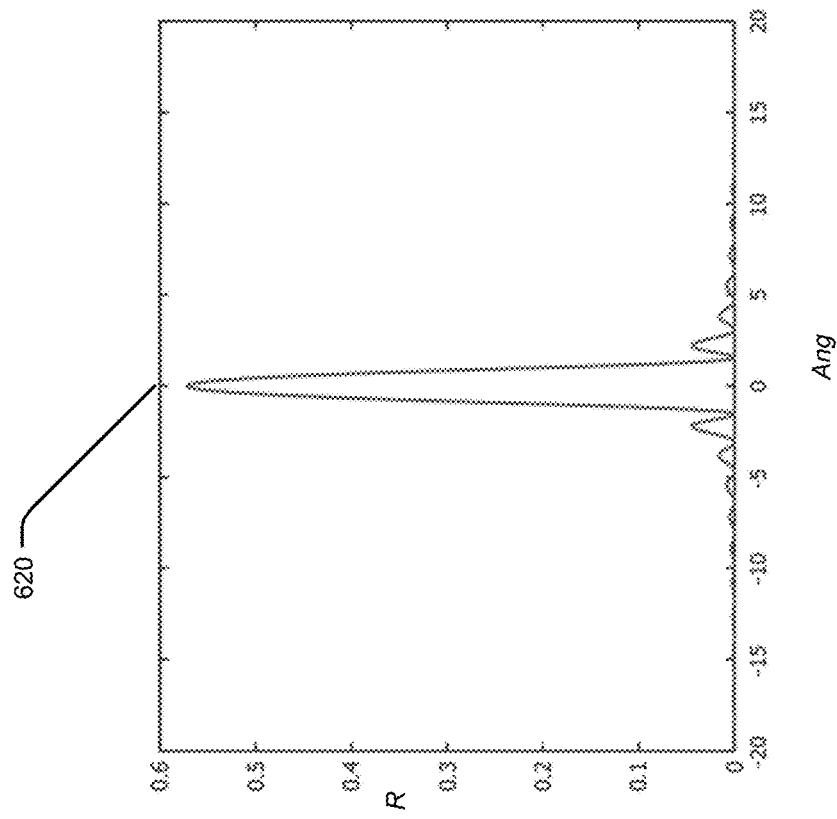

In an example, FIG. 6C illustrates respective spectral response characteristics 620 and 630 of a single VBG component and a slant mirror respectively. As seen in 620 and 630, the spectral response of VBG is relatively narrower than the partial reflective surface/slant mirror. The systems and methods described implement a combination of VBG component and partial reflective component to reflect or propagate the display light to achieve a resultant expected hybrid spectral response that maximizes the coverage in the FOV.

Figure 6E:
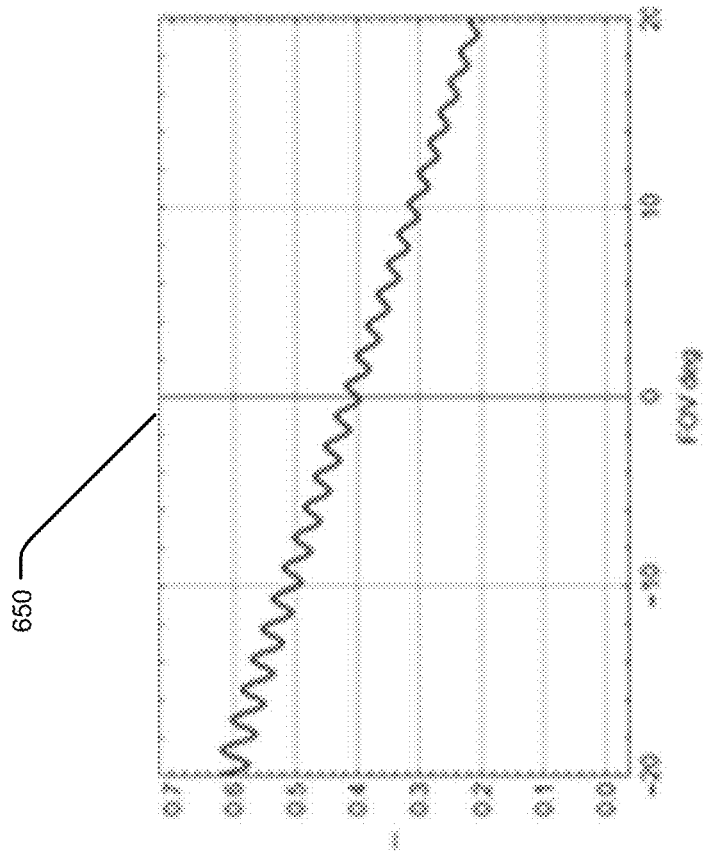
FIG. 6D-6H illustrates various spectral response characteristics of a single VBG component and a slant mirror, according to various examples.
Figure 6D:
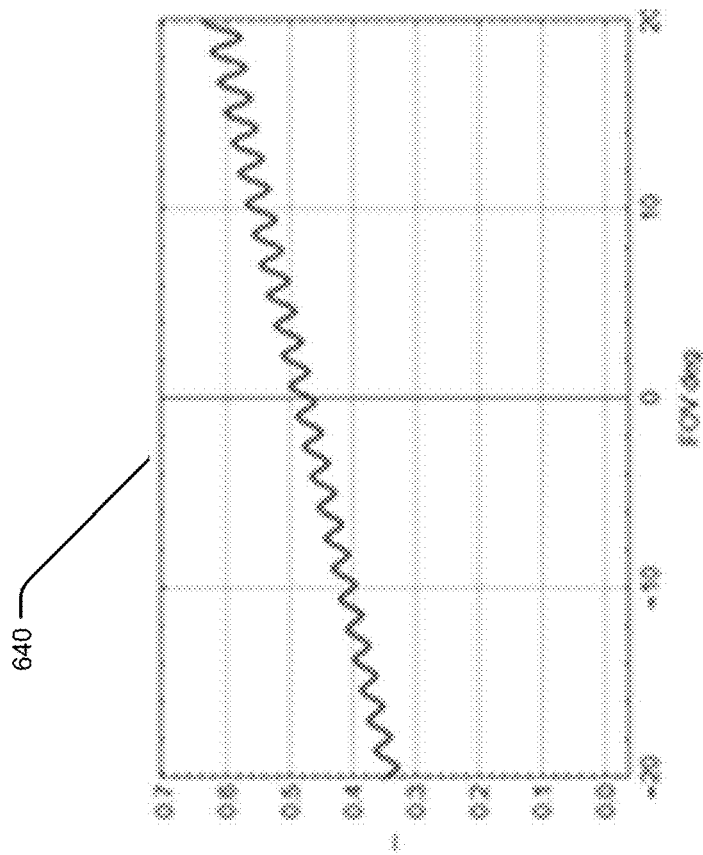

The expected hybrid spectral response may include at least one of a hybrid reflective response or a hybrid transmissive response pertaining to reflection or transmission characteristics respectively of the hybrid waveguide configuration including VBG component and partial reflective component. It may be appreciated that the spectral response in 620, which shows a narrow peak mainly pertains to a single VBG. However, the display light may be exposed to a waveguide several times that may result in a MUX VBG response, as shown in FIGS. 6D-6E. For example, FIG. 6D depicts a MUX-VBG1 response 640 and FIG. 6E depicts MUX VBG2 response 650.

Figure 6G:
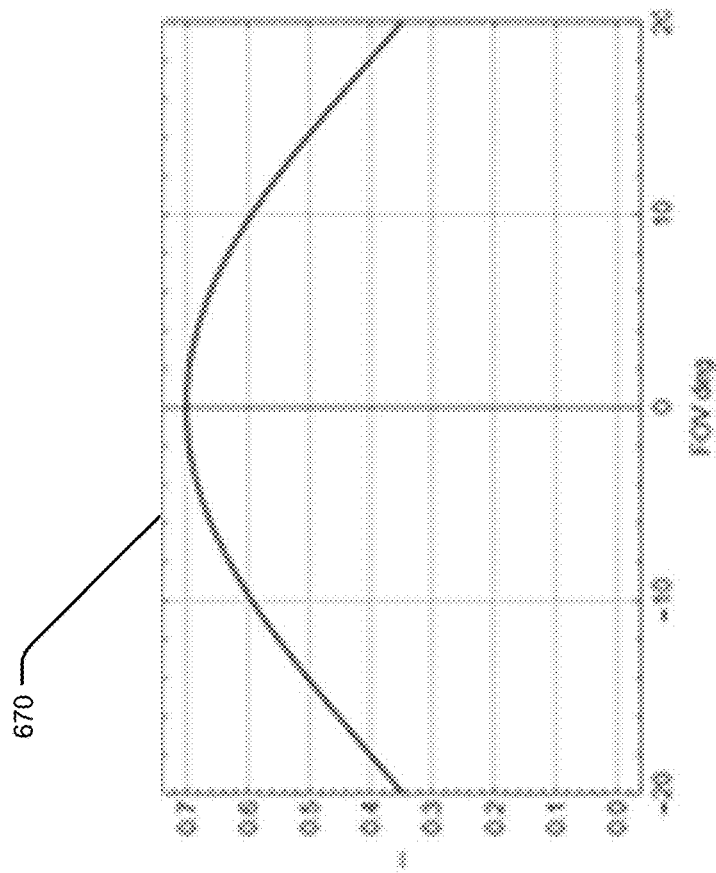
Figure 6F:
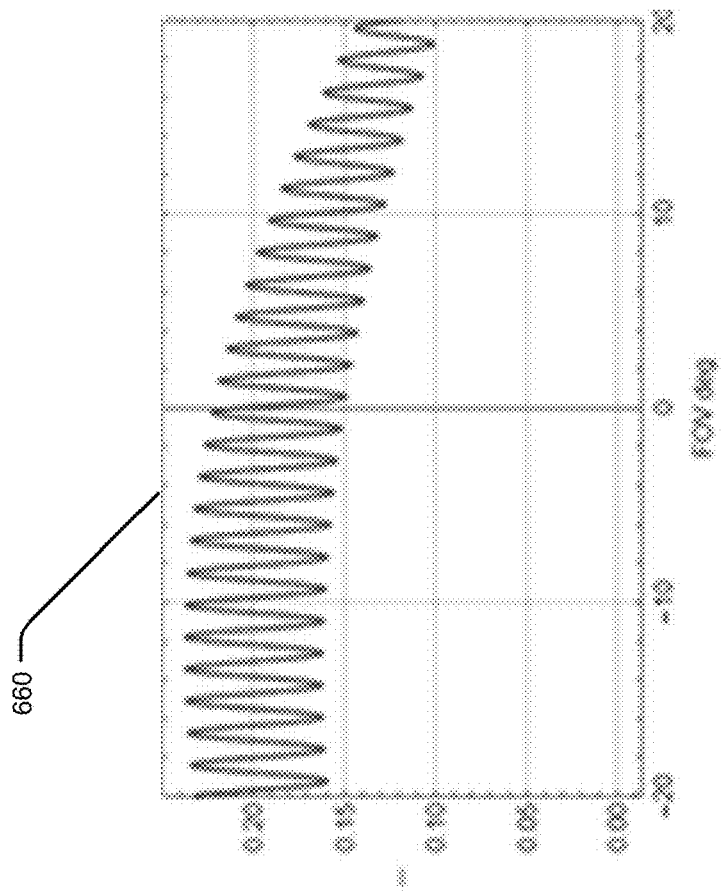
Figure 6H:
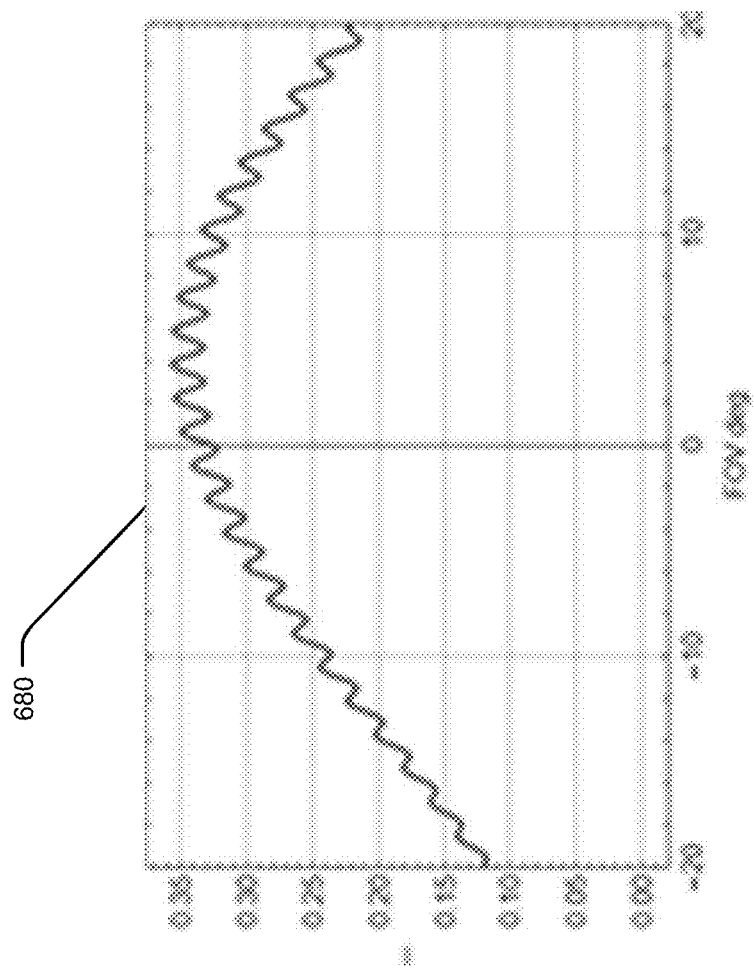

Even though a conventional MUX VBG response may be a broad curve obtained by combination or merging of several peak based curves that may get added to fill up the field of view (FOV) (i.e. a peaky broad response), but the broad curve includes spikes or peaky nature and may lack uniformity. In an embodiment, although the spectral response pertaining to the hybrid configuration may be limited by the MUX VBG response, but the hybrid response curve may be rather uniform, as shown in FIGS. 6F-6H. Here, FIG. 6F depicts a total response of MUX-VBG1 with MUX-VBG2 660, FIG. 6G depicts a partial reflective facets response 670, and FIG. 6H depicts a total response of MWG 680. In addition, the present waveguide configuration may enable to effectively customize/adjust final spectral response for a desired FOV by combining VBG and partial reflective components in various configurations. In some examples, the expected hybrid spectral response may also facilitate an expected pattern of reflection or propagation (or transmission) of the display light from the VBG component to the partial reflective component or vice-versa to achieve minimization of the ghost image or the intercepting optical lines pattern.

FIGS. 7A-7E illustrate examples of a waveguide configurations 700, 710, 720, 730, and 740 including various arrangements of VBG component and partial reflective component, according to an example. In some examples, the waveguide configuration 600 may be used in a display system, similar to the near-eye display system 300 of FIG. 3. Each of the configurations described in FIGS. 7A-7E may include an input component, one or more middle components and an output component (similar to typical configuration in FIG. 6A). However, unlike the typical configuration in FIG. 6A, the example configurations as shown in FIGS. 7A-7E include a combination of VBG component and a partial reflective component that are oriented in a predetermined configuration to reflect or propagate the display light. This enables to maximize a coverage in field of view (FOV) at the eyebox, while minimizing at least one of a ghost image or an intercepting optical lines pattern. In some examples, additional components such as prism couplers may also be added.

In some examples, projector of the display system may transmit display light to the arrangement of VBG component and the partial reflective component in the waveguide configuration. Similar to the basic arrangement in typical configuration 600 of FIG. 6, the projector may output the display light to an input component. The input component may propagate the display light received from the projector to a middle component, which may propagate the received display light to another middle component or the output grating. The output grating may include a grating configuration that may propagate the received display light to an eyebox or a user's eye (not shown). The display light may be associated with an image that may be displayed on the eyebox or that a user may otherwise see the image. Specifically, in the present configuration, each of the input, the middle and the output components may include VBG component and the partial reflective component (and/or prism couplers) to cause received light to be propagated, e.g., refracted, diffracted, and/or reflected, into certain directions, as indicated by thick black arrows in FIGS. 7A-7E. It should be understood that the arrows depicted in FIGS. 7A-7E may represent a plurality of light rays that may, for instance, expand as the light rays are propagated from the input component, the middle component(s), and the output component.

In some examples, the VBG component may include at least one of an input VBG component, a middle VBG component or an output VBG component. The partial reflective component may refer to a mirrored surface having a broad spectral response as shown in FIG. 6C. In some examples, the partial reflective component may include at least one of a slant mirror, a partial reflective mirror, a pinhole mirror, a multi-layered coating based mirror, a metal coating based mirror, a dielectric coating based mirror or a mirror including combination of dielectric coating and metal coating. The "pinhole mirror" may refer to mirrors that may function based on pinhole principle and the "dielectric coating" may refer to mirrors having multi-layer coatings of material varying in dielectric properties. In some examples, the mirror including combination of dielectric coating and metal coating may include a dielectric coating and multi-layered metal coating. In some examples, the dielectric coating based mirror may include multi-layered dielectric coatings. In some examples, the partial reflective component can be modified with multi-layered coatings to adjust angular and wavelength dependency in the spectral response. For example, partial reflective component may be coated with a silver coating, wherein based on the thickness of the coating, the angular and wavelength dependency may be varied significantly. Various other types of coating materials of different possible thickness may be used.

Figure 7B:
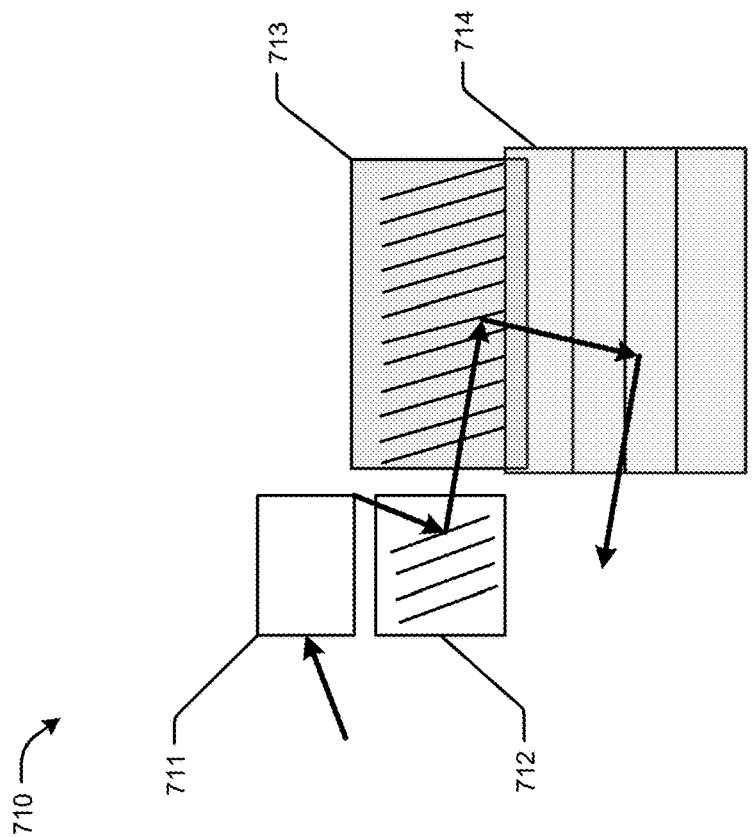
FIGS. 7A-7E illustrate examples of a waveguide including various arrangements of VBG component and partial reflective component, according to an example.
Figure 7A:
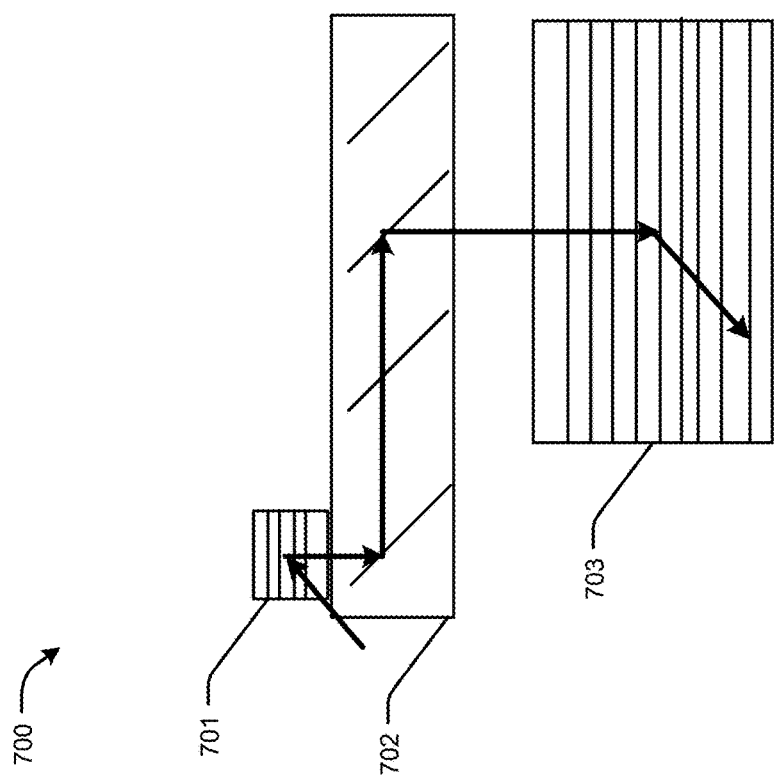

As shown in FIG. 7A, the waveguide may include a pre-determined configuration 700 that may include an input component 701, a middle component 702 and an output component 703. In an example and as shown in the configuration 700, a VBG component may be selected as the input component 701 and the output component 703, whereas a partial reflective component may be selected to be the middle component 702. In some examples, the VBG component that is used as the output component 703 may be a reflective or transmissive VBG. As observed in FIG. 7A, display light (shown by black arrow) may be propagated and reflected through the VBG component 701 and further reflected to the middle component (partial reflective component) 702. The partial reflective component 702 may reflect the display light twice. Thus, in this example, the presence of a single middle grating/partial reflective component 702 facilitates dual reflection, thereby avoiding the need to include multiple middle gratings/VBGs. The display light is finally reflected to the output component 703, which may further propagate the display light to the eyebox. In some examples, the reflective or transmissive characteristics of the output VBG component 703 may be altered based on requirement of at least one of the expected coverage in the FOV or avoidance of a ghost path pertaining to the ghost image.

In some examples, at least one of the VBG component or the partial reflective component may be coupled with a prism coupler. The prism coupler may allow a pre-determined diffraction or dispersion of the display light prior to a corresponding propagation of the display light. As shown in FIG. 7B, the waveguide may include a pre-determined configuration 710 that may include an input component 711, a first middle component 712, a second middle component 713 and an output component 714. In an example and as shown in the configuration 710, the waveguide may include a prism coupler as the input component 711, the VBG component as the middle components 712 and 713, and the partial mirror component as the output component 714 such that each component reflects or propagates the display light to achieve an expected hybrid spectral response that maximizes the coverage in the FOV. As observed in FIG. 7B, display light (shown in bold arrows) may be propagated and reflected through the prism coupler 711 that may allow a pre-determined diffraction or dispersion of the display light prior to a corresponding propagation to the first middle VBG component 712. The first middle VBG component 712 may further reflect the display light to the second middle VBG component 713. In an example, the second middle VBG component 713 may be reflective VBG. The second middle VBG component 713 may reflect the display light to partial reflective component (output component) 714, which in turn may be able to propagate the display light to the eyebox. In some examples, the reflective or transmissive characteristics of the partial reflective component 714 may be altered based on requirement of at least one of the expected coverage in the FOV or avoidance of a ghost path pertaining to the ghost image.

Figure 8A:
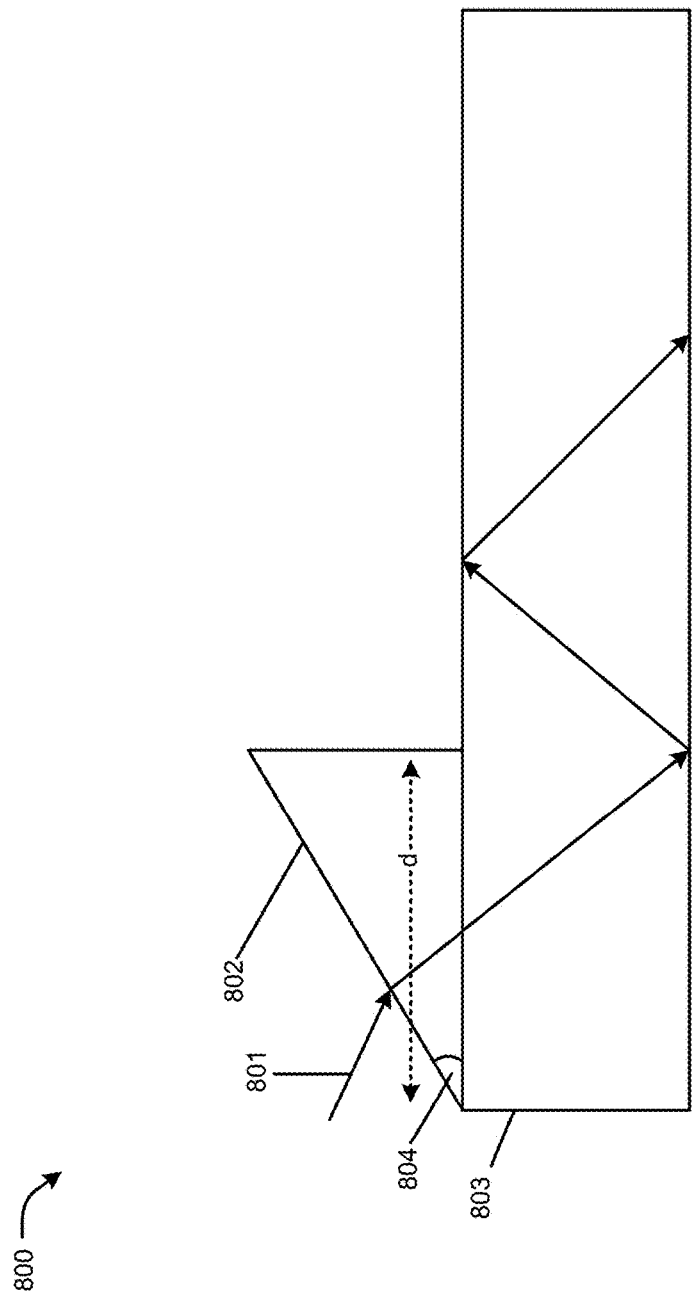
FIG. 8A illustrates an in coupling of a VBG component with a prism coupler, according to an example.

FIG. 8A illustrates an incoupling of VBG component with a prism coupler, according to an example. As shown in FIG. 8A, a prism coupler 802 (similar to prism coupler 711 of FIG. 7B) may be coupled to a waveguide or any component of waveguide 803. In some examples, the prism coupler 802 may include a contact portion (shown as "d") with a surface of the VBG component 803 to which the prism coupler may be coupled. In some examples, the length of the contact portion "d" may be in the range of 2 mm to 3 mm. In some examples, the prism index may be in the range of 1.7 to 1.9. Further, at the contact portion "d" the prism coupler 802 may include at least one internal angle 804. In some examples, the internal angle 804 may be in the range of 30 degrees to 60 degrees. The contact portion "d", the internal angle and/or other dimensions of the prism coupler may be customized in such a way that the display light 801 may be diffracted or dispersed by a desired value based on the requirements of the propagation and the components of the waveguide. In some examples, the dispersion may be corrected by using an additional prism (having same index as the waveguide index) so that center FOV may be orthogonal to a first input surface. In some examples including a prism coupler, a minimal waveguide thickness may be used to provide minimal pupil clipping. In some examples, the prism incoupling may be configured from an edge to reduce pupil clipping.

Figure 7D:
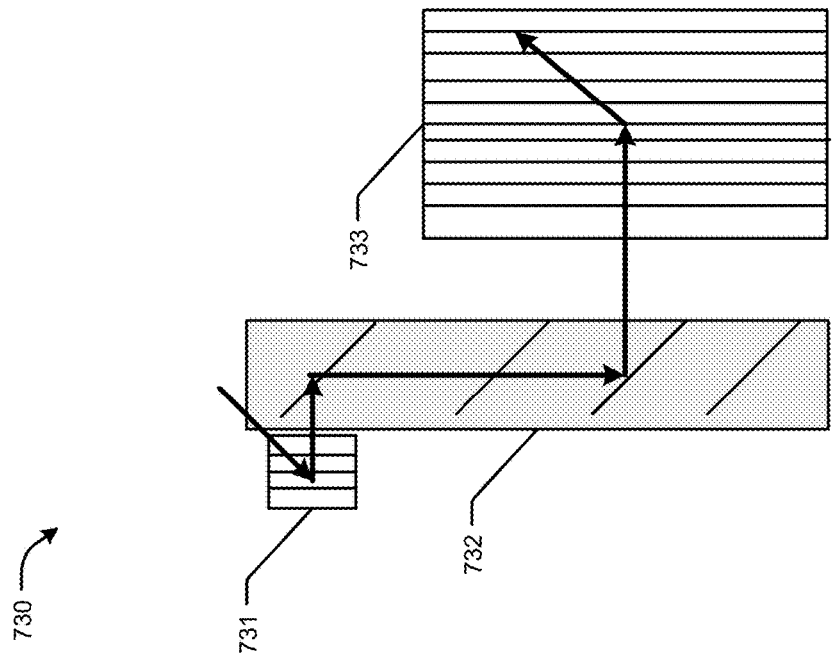
Figure 7C:
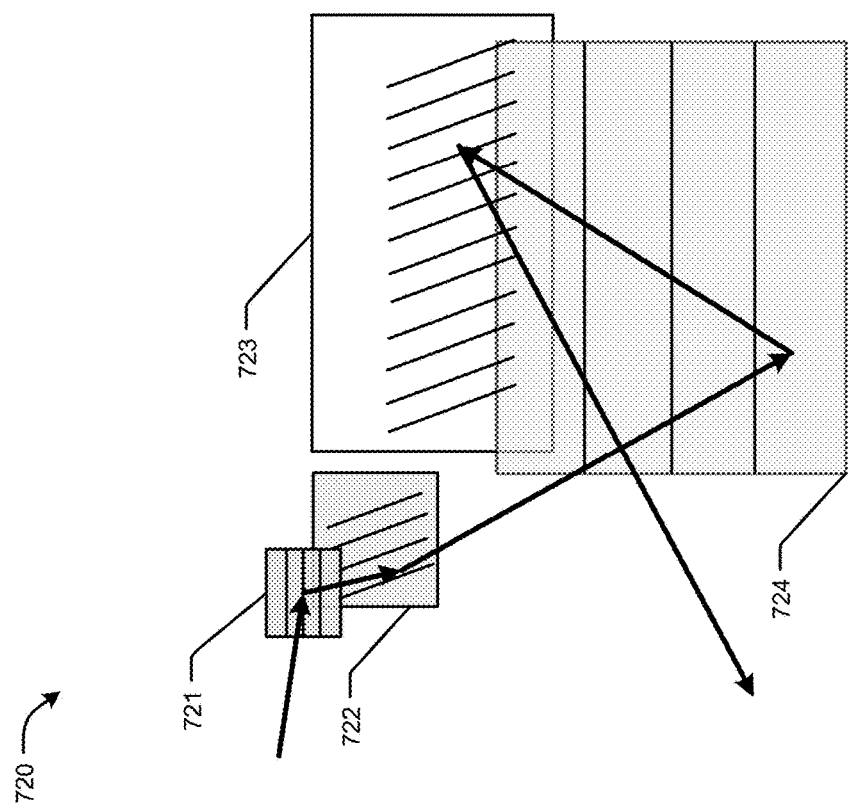

In some examples, the systems and methods described herein may enable alteration of the display light in such a way that any potential ghost path can be avoided. Referring to FIG. 7C, the waveguide may include a pre-determined configuration 720 similar to the configuration 710 in FIG. 7B, except that instead of prism coupler may be replaced with a partial reflective component (such as, for example, a slant mirror). In an example and as shown in FIG. 7C, to facilitate the propagation of display light (not shown), configuration 720 may include a slant mirror as the input component 721, two separate VBGs as the middle components 722 and 723, and a partial reflective component as the output component 724. In some examples, the waveguide comprises a pre-defined overlapping between the VBG component and the partial reflective component, such as, for example, as shown in FIG. 7C (between components 723 and 724) to facilitate an optimization of at least one of resolution or form factor. As shown in FIG. 7C, the appropriate configuration may lead to prevention of potential ghost path, which otherwise may have formed undesired of ghost images.

In some examples, the pre-determined configuration is a configuration having a tilted or rotated configuration with respect to earlier described configurations such as configurations 700 or 710 as shown respectively in FIGS. 7A and 7B. As shown in FIG. 7D, the waveguide may include a pre-determined configuration 730 that may include VBG component as an input component 731, slant mirror as a middle component 732, and a reflective/transmissive VBG as an output component 733. In an example and as shown in the configuration 730, the waveguide includes a tilted or rotated configuration to that shown in FIG. 7A, such that each component reflects or propagates the display light to achieve an expected hybrid spectral response (hybrid reflective/transmissive response) that maximizes the coverage in the FOV. The titled configuration refers to a rotated configuration that may be adapted to facilitate design of the VBG and partial reflector so as to enable leakage of light or light leaks (for example, at the end of second arrow in FIG. 7D). The leaked light may be a guide to sensors (such as, for example disparity sensor) at nose bridge region of headset or lens assembly of AR device. As observed in FIG. 7D, display light (shown in bold arrows) may be propagated and reflected through the input VBG component 731 to the middle component 732, which in turn may further reflect the display light to the output VBG component 733. In some examples, the reflective or transmissive characteristics of the output VBG component 733 may be altered based on requirement of at least one of the expected coverage in the FOV or avoidance of a ghost path pertaining to the ghost image.

Figure 7E:
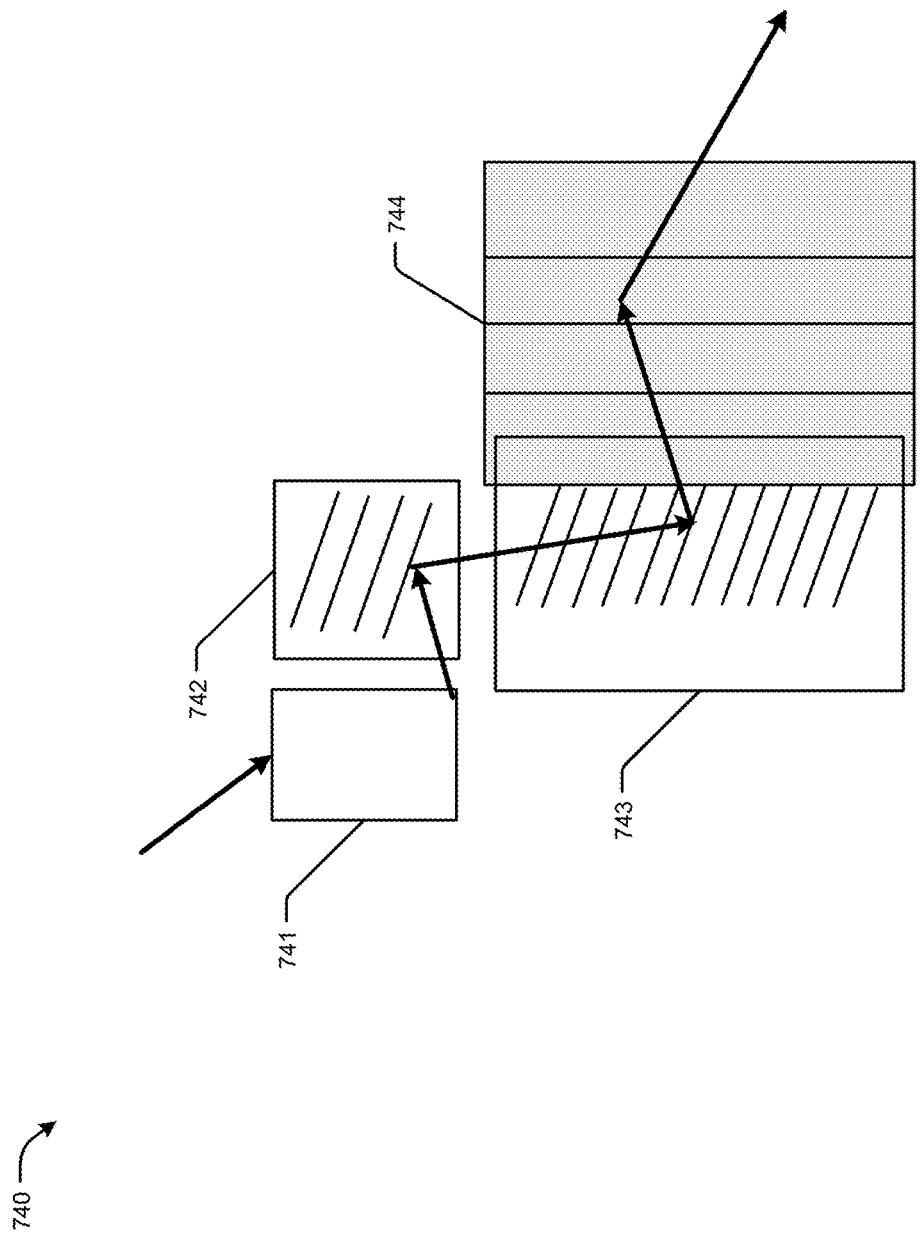

In an example and as shown in the configuration 740 of FIG. 7E, the waveguide includes a tilted or rotated configuration to that shown in 710 in FIG. 7B. As shown in FIG. 7E, the waveguide may include a pre-determined configuration 740 that may include a prism coupler as an input component 741, VBG as a first middle component 742 and a second middle component 743, and a partial reflective component as an output component 744. The titled configuration refers to rotated configuration as compared to configuration 710 in FIG. 7B, which may be adapted to facilitate design of the VBG and partial reflector so as to enable leakage of light or light leaks as explained above in FIG. 7D. As observed in FIG. 7E, display light (shown in bold arrows) may be propagated and diffracted/dispersed through the input prism coupler 741 to the first middle component 742, which in turn may further reflect the display light to the second middle component 743 and output VBG component 744. In some examples, the reflective or transmissive characteristics of the output component 744 may be altered based on requirement of at least one of the expected coverage in the FOV or avoidance of a ghost path pertaining to the ghost image.

Figure 8B:
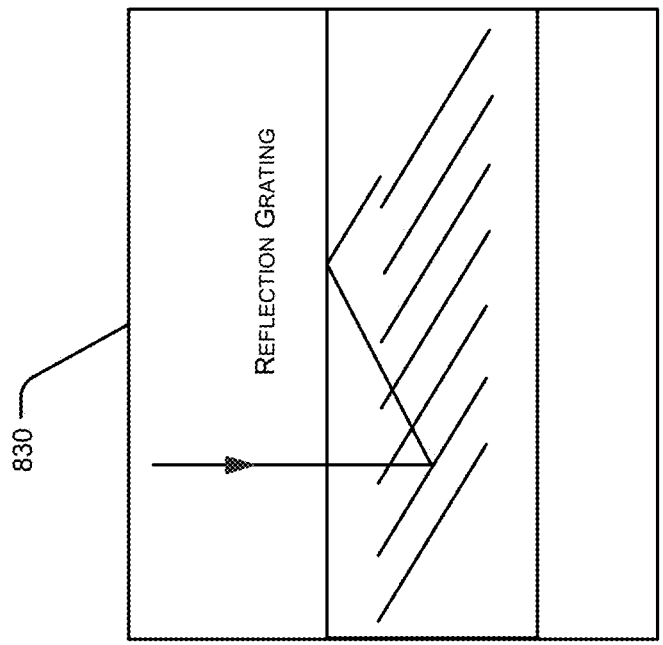
FIG. 8B illustrates configurations including variation in grating angle of VBG component to vary reflective or transmissive characteristics, according to an example.
Figure 8B:
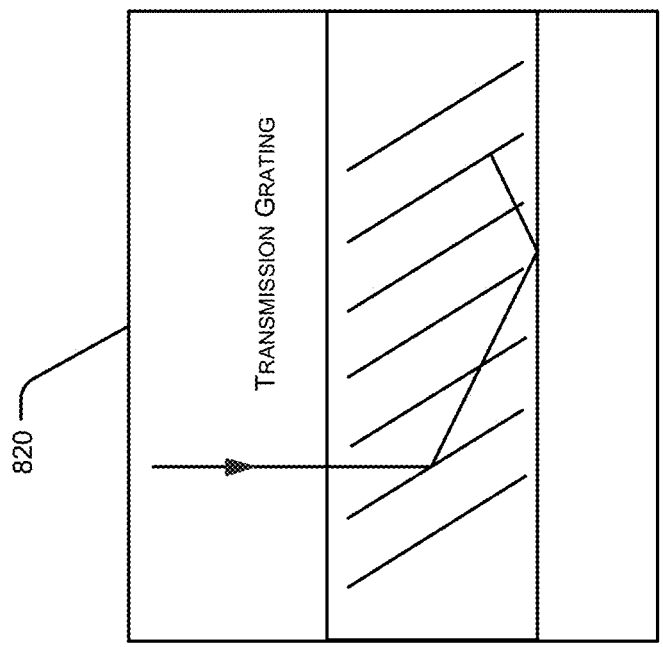

In an embodiment, reflective or transmissive characteristics of the VBG component and/or the partial reflective component may be altered based on requirement of at least one of the expected coverage in the FOV or avoidance of a ghost path pertaining to the ghost image. In some examples, it may be possible to alter the reflective or transmissive characteristics of the grating angle (slant angle) of the VBG, to switch the characteristics to reflection VBG component or transmission VBG component. FIG. 8B illustrates configurations 830 and 820 including variation in grating angle of VBG component to vary reflective or transmissive characteristics respectively, according to an example. As shown in 820, the grating angle or the slant angle may be such that the VBG grating behaves as a transmission grating. For example, the slant angle may pertain to, for example, 30 degrees for obtaining transmission VBG grating. As shown in 840, the grating angle or the slant angle may be such that the VBG grating behaves as a reflection grating for a sufficient FOV. For example, the slant angle may pertain to, for example, 60 degrees for obtaining reflection VBG grating. It may be appreciated that the mentioned configurations or slant angles are only exemplary and various other slant angle/modifications may be possible to vary the reflective or transmissive characteristics of the VBG component (or partial reflective component).

Figure 8C:
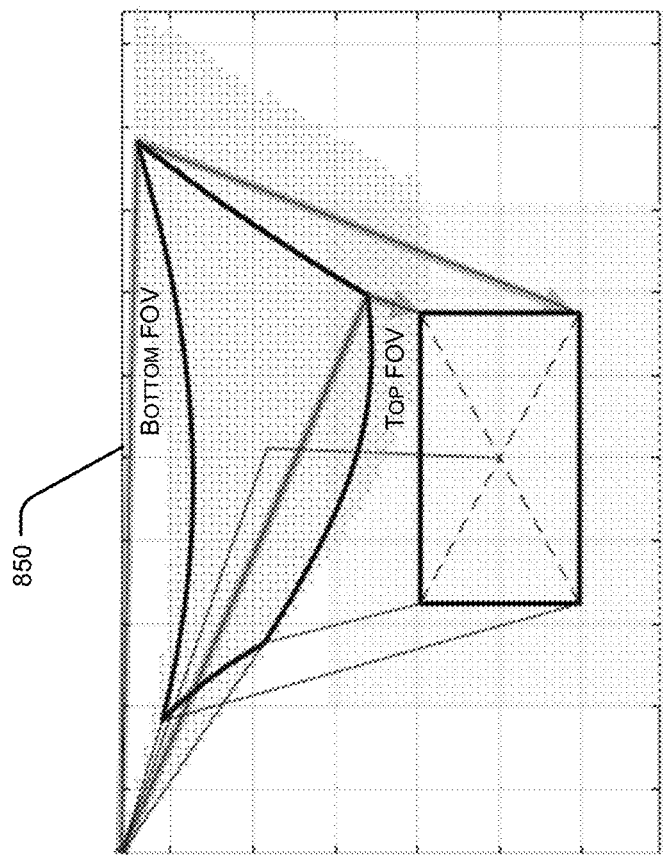
FIG. 8C illustrates possible configuration of a transmission output grating and a reflective output grating in a waveguide configuration, according to an example.
Figure 8C:
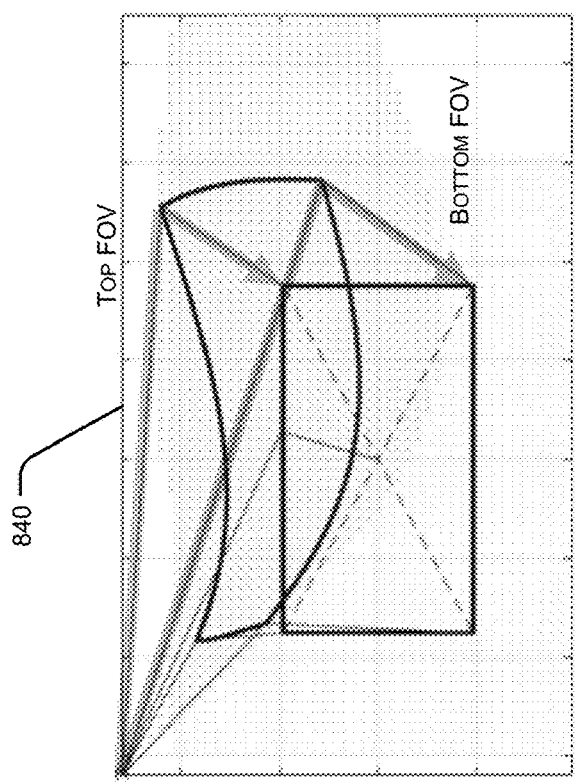

In an embodiment, the waveguide may include a pre-defined overlapping between the gratings such as, for example, between VBG component and the partial reflective component (or between two VBG components) to facilitate an optimization of at least one of resolution or form factor. FIG. 8C illustrates possible configurations 840 and 850 of a transmission output grating and a reflection output grating, respectively, in a waveguide configuration to show the optimization of at least one of resolution or form factor, according to an example. As shown in 840, the configuration pertains to a transmission output grating including a pre-determined overlap between gratings. This may lead to a compact form factor, while having relatively reduced resolution than reflection output grating 850 due to transmission grating characteristics. Further, as shown in 850, the configuration pertains to a reflection output grating with no overlap between the gratings. This may enable to improve the resolution while leading to an increase in form factor. Based on the required outcome, the optimization of at least one of resolution or form factor may be performed by modifying the overlapping characteristics.

Figure 9:
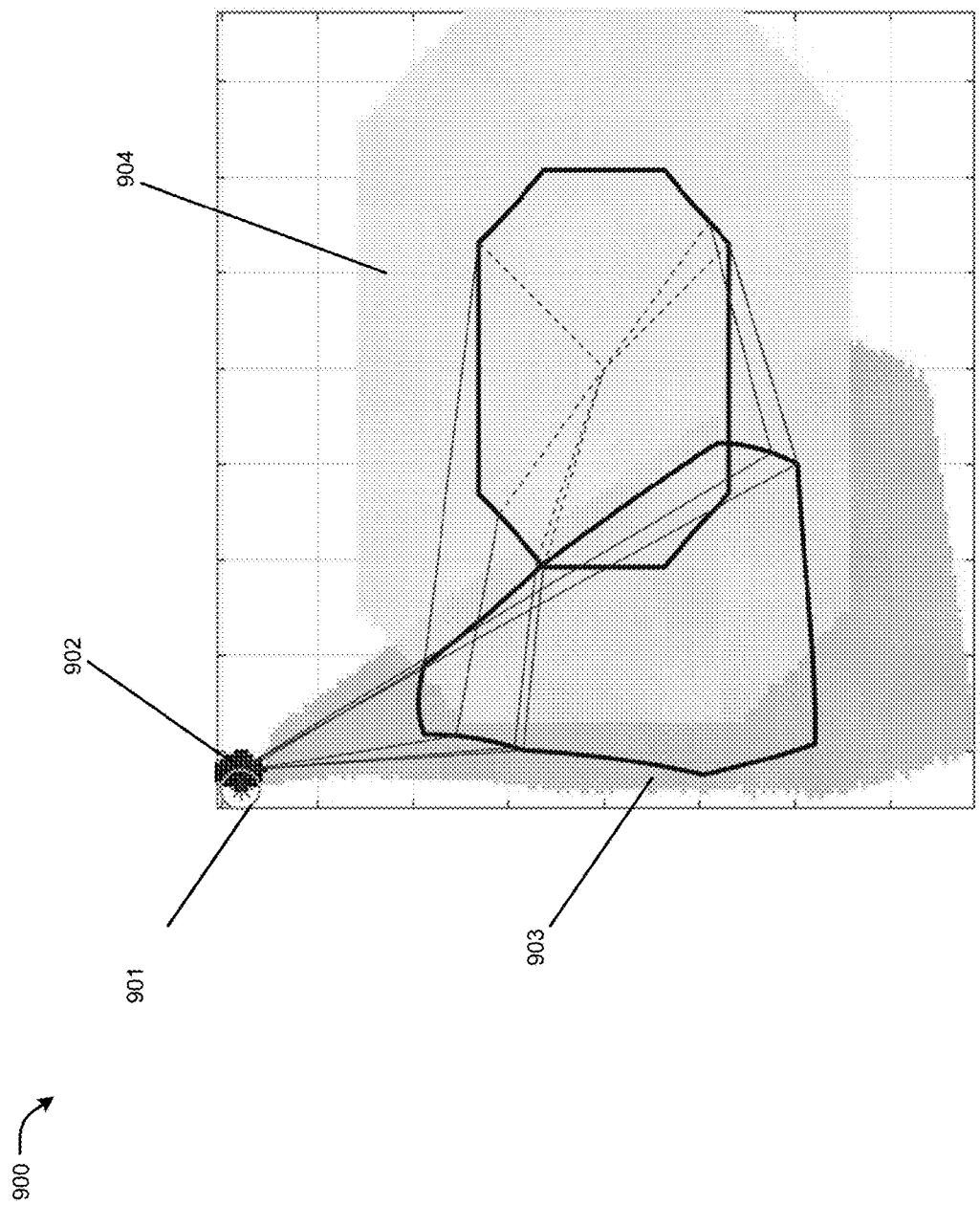
FIG. 9 illustrates a diagram of a waveguide including an arrangement of VBG and slant mirror, according to an example.

In some examples, the mirror index of the partial reflective component is in the range of 1.7 to 1.9. In an example, mirror index may be 1.8 and polymer index may be 1.55. In some examples, thickness of the waveguide is in the range of 0.1 mm to 1.6 mm, preferably 0.4 mm to 1.6 mm. In an example, the waveguide including prism coupler may be relatively thicker (for example, thickness in the range of 1 mm to 1.5 mm) than the configurations that do not include prism coupler. In some examples, the waveguide may include a photopolymer having a thickness in the range of 10 µm to 70 µm. In some examples, diagonal FOV achieved through waveguide described herein may be less than 60 degree. FIG. 9 illustrates a diagram of a specific waveguide configuration including an arrangement of VBG and slant mirror, according to an example. As shown in FIG. 9, an input component 901 is a VBG component, first middle component 902 is a first slant mirror, second middle component 903 is a second slant mirror and the output component 904 is a VBG component. The lines and dotted lines in FIG. 9 display the propagation (reflection/transmission) of display light through the waveguide to an eyebox (not shown). In some examples, the partial reflective components (902 or 903) may facilitate multiple bounces (for example 10 bounces) within waveguide 900, wherein diffraction may be, for example, 10%, and total internal reflection (TIR) may be 90% guided through to maintain reasonable output efficiency. In some examples, the waveguide configuration may include spatial varying response by including, for example, spatial varying coating to optimize uniformity. For example, it may be possible to vary the response between reflection to transmission in the range of, for example, 10:90 to 50:50. Various other techniques may be used to vary the reflective/transmissive characteristics.

As explained in FIGS. 7A-7E and FIG. 8A, the waveguide configuration may include any number of VBG component, partial reflective component and/or prism couplers that may be exposed into a "see-through" photopolymer material, such as glass or plastic. In some examples and as discussed above, one or more of the arrangement of the components may be patterned (e.g., using sinusoidal patterning) into and/or on a surface of the photopolymer material. In this way, the entire waveguide configuration may be relatively transparent so that a user may see through to the other side. At the same time, the waveguide configurations, with its various arrangements of VBG component, partial reflective component and/or prism coupler may (among other things) receive the propagated display light from the projector and exit the propagated display light in front of a user's eyes for viewing. In this way any number of augmented reality (AR) and/or mixed reality (MR) environments may be provided to and experienced by the user. In addition, in some examples, the arrangement of components in the waveguide configuration may be implemented to "expand" (i.e., horizontally and/or vertically) a region in space to be viewed so that a user may view a displayed image regardless of where a pupil of a user's eye may be. As such, in some examples, by expanding this viewing region, the arrangement of the components may ensure that a user may move their eye in various directions and still view the displayed image.

In some examples, the display system as described herein may be in form of glasses, spectacles, googles or other forms of eyewear that include a first lens assembly (for user's right eye) and a second lens assembly (for user's left eye). The first lens assembly may include a first temple arm and the second lens assembly including a second temple arm that may be positioned next to a user's right temple and user's left temple respectively, when the display system is positioned with respect to the user's eyes. In some examples, near each temple arm, a projector may be positioned, wherein each projector may be positioned and configured to direct display light from the respective projector into the components of the waveguide that further projects the display light onto an eyebox positioned near the respective eyes of the user. Accordingly, in some examples, the first lens assembly and the second lens assembly may present a first image and a second image, respectively, to be viewed by a user's respective eye, when wearing the display system, to generate a simultaneous, "binocular" viewing. That is, in some examples, the first image projected by the first lens assembly and the second image projected on the second lens assembly may be uniformly and symmetrically "merged" to create a binocular visual effect for a user of the display system. In other examples, one of the first lens assembly or the second lens assembly may be omitted from the display system such that a monocular viewing is provided to a user of the display system.

In an example, an augmented reality system may include the display system in the previous examples as described herein. The display system may include a wearable eyewear arrangement that includes a lens assembly. The lens assembly may include a projector and a waveguide. The projector may propagate display light associated with an image. The waveguide may propagate the display light to an eyebox. The waveguide may include a combination of VBG component and partial reflective component that are oriented in a pre-determined configuration to reflect or propagate the display light to maximize a coverage in field of view (FOV) at the eyebox, while minimizing at least one of a ghost image or intercepting optical lines pattern.

Figure 10:
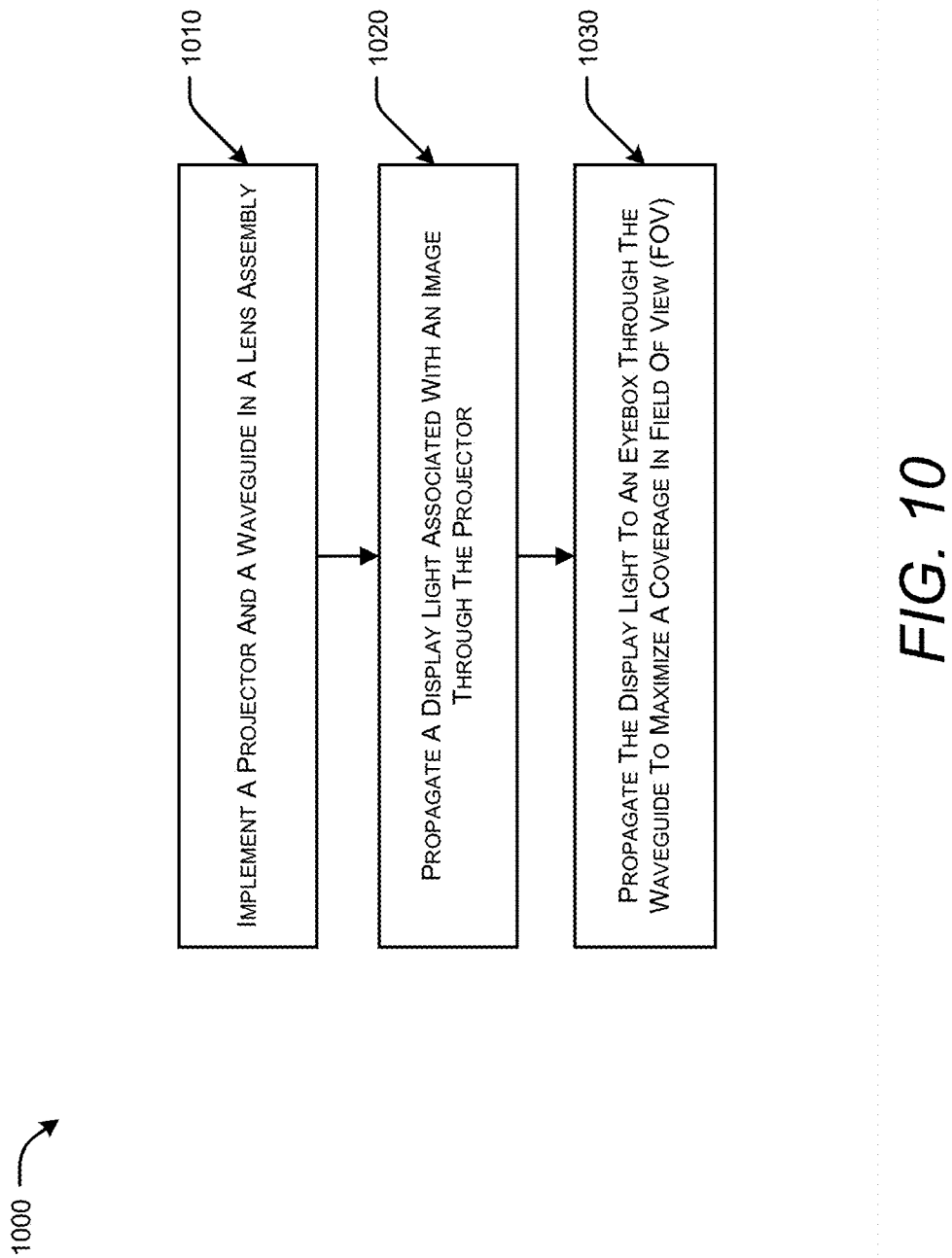
FIG. 10 illustrates a method to implement a waveguide to maximize coverage in field of view (FOV) of an eyebox, according to an example.

FIG. 10 illustrates a method 1000 to implement a waveguide to maximize coverage in FOV of an eyebox, according to an example. The method 1000 is provided by way of example, as there may be a variety of ways to carry out the method described herein. Each block shown in FIG. 10 may further represent one or more processes, methods, or subroutines, and one or more of the blocks may include machine-readable instructions stored on a non-transitory computer-readable medium and executed by a processor or other type of processing circuit to perform one or more operations described herein.

Although the method 1000 is primarily described as being performed by configurations as shown in the previous figures pertaining to the systems and methods described herein, the method 1000 may be executed or otherwise performed by other systems, or a combination of systems. It should also be appreciated that, in some examples, the method 1000 may be implemented in conjunction with a content platform (e.g., a social media platform) to generate and deliver content.

Reference is now made with respect to FIG. 10. At 1010, the method may include a step of implementing a projector and a waveguide in a lens assembly. So, in some examples, the waveguide may include a combination of VBG component and partial reflective component that are oriented in a pre-determined configuration.

At 1020, the method may include a step of propagating, through the projector, a display light associated with an image implementing a projector and a waveguide in a lens assembly.

At 1030, the method may include propagating, through the waveguide, the display light to an eyebox. In some examples, the pre-determined configuration of the waveguide may facilitate to reflect or propagate the display light to maximize a coverage in field of view (FOV) at the eyebox, while minimizing at least one of a ghost image or intercepting optical lines pattern. In some examples, at least one of the VBG component or the partial reflective component may be coupled with a prism coupler to allow a pre-determined diffraction or dispersion of the display light prior to a corresponding propagation of the display light.

In some examples, the waveguide includes at least one of the prism coupler, the VBG component or the partial reflective component configured as an input component, one or more middle components or an output component such that each component reflects or propagates the display light to achieve an expected hybrid spectral response that maximizes the coverage in the FOV. In some examples, the expected hybrid spectral response (hybrid reflective/transmissive response) may be broader than the spectral response i.e. respective reflective/transmissive response of a single VBG component and narrower than the spectral response i.e. respective reflective/transmissive response of the partial reflective component. In some examples, the expected hybrid spectral response facilitates an expected pattern of reflection or propagation of the display light from the VBG component to the partial reflective component or vice-versa to achieve minimization of the ghost image or the intercepting optical lines pattern. In some examples, reflective or transmissive characteristics of the VBG component and the partial reflective component are altered based on requirement of at least one of the expected coverage in the FOV or avoidance of a ghost path pertaining to the ghost image.

In the foregoing description, various inventive examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. A display system, comprising:
a wearable eyewear arrangement, comprising:
a lens assembly comprising:
a projector to propagate display light associated with an image; and
a waveguide for propagating the display light to an eyebox, wherein the waveguide comprises a combination of a volume Bragg grating (VBG) component and a partial reflective component that are oriented in a pre-determined configuration to reflect or propagate the display light to maximize a coverage in field of view (FOV) at the eyebox, and wherein the waveguide comprises a pre-defined overlapping between the VBG component and the partial reflective component.

2. The display system of claim 1, wherein the VBG component comprises at least one of an input VBG component, a middle VBG component, or an output VBG component.

3. The display system of claim 1, wherein the partial reflective component comprises at least one of a slant mirror, a partial reflective mirror, a pinhole mirror, a multi-layered coating based mirror, a metal coating based mirror, a dielectric coating based mirror, or a mirror including a combination of dielectric coating and metal coating.

4. The display system of claim 1, wherein mirror index of the partial reflective component is in a range of 1.7 to 1.9.

5. The display system of claim 1, wherein thickness of the waveguide is in a range of 0.4 mm to 1.6 mm.

6. The display system of claim 1, wherein the waveguide includes a photopolymer having a thickness in a range of 10 μm to 70 μm.

7. The display system of claim 1, wherein at least one of the VBG component or the partial reflective component is coupled with a prism coupler to allow a pre-determined diffraction or dispersion of the display light prior to a propagation of the display light.

8. The display system of claim 7, wherein the prism coupler includes a contact portion with a surface of the VBG component, wherein a length of the contact portion is in a range of 2 mm to 3 mm, and wherein at the contact portion, the prism coupler includes at least one internal angle in a range of 30 degrees to 60 degrees.

9. The display system of claim 1, wherein the partial reflective component includes a broader spectral response than the VBG component, and wherein the spectral response includes at least one of a reflective response or a transmissive response.

10. The display system of claim 7, wherein the waveguide includes at least one of the prism coupler, the VBG component or the partial reflective component configured as an input component, one or more middle components or an output component.

11. The display system of claim 1, wherein the pre-determined configuration is a configuration comprising the VBG component as an input component and an output component and the partial reflective component as a middle component.

12. The display system of claim 10, wherein the pre-determined configuration is a configuration comprising the prism coupler as the input component, the VBG component as the one or more middle components, and the partial reflective component as the output component.

13. The display system of claim 1, wherein the pre-determined configuration is a tilted or rotated configuration to cause the display light to be propagated through the VBG component and the partial reflective component to maximize the coverage in the FOV.

14. The display system of claim 10, wherein the combination of the VBG component and the partial reflective component provides a hybrid spectral response that is broader than a spectral response of a single VBG component and narrower than the spectral response of a single partial reflective component.

15. The display system of claim 10, wherein the combination of the VBG component and the partial reflective component provides a hybrid spectral response that facilitates an expected pattern of reflection or propagation of the display light from the VBG component to the partial reflective component to achieve minimization of a ghost image or an intercepting optical lines pattern.

16. The display system of claim 1, wherein the waveguide further comprises an additional VBG component and an additional partial reflective component, and another pre-defined overlapping between the additional VBG component and the additional partial reflective component to facilitate an optimization of at least one of resolution or form factor.

17. The display system of claim 1, wherein reflective or transmissive characteristics of the VBG component and the partial reflective component are altered based on requirement of at least one of the coverage in the FOV.

18. An augmented reality system comprising:
a display system comprising a wearable eyewear arrangement that includes:
a lens assembly comprising:
a projector to propagate display light associated with an image; and
a waveguide for propagating the display light to an eyebox, wherein the waveguide comprises a combination of a volume Bragg grating (VBG) component and a partial reflective component that are oriented in a pre-determined configuration to reflect or propagate the display light to maximize a coverage in field of view (FOV) at the eyebox, and wherein the waveguide comprises a pre-defined overlapping between the VBG component and the partial reflective component.

19. A method comprising:
implementing a projector and a waveguide in a lens assembly;
propagating, through the projector, a display light associated with an image; and
propagating, through the waveguide, the display light to an eyebox, wherein the waveguide comprises a combination of a volume Bragg grating (VBG) component and a partial reflective component that are oriented in a pre-determined configuration to reflect or propagate the display light to maximize a coverage in field of view (FOV) at the eyebox, and wherein the waveguide comprises a pre-defined overlapping between the VBG component and the partial reflective component.

20. The method of claim 19, wherein the waveguide further comprises an additional VBG component and an additional partial reflective component, and another pre-defined overlapping between the additional VBG component and the additional partial reflective component.

* * * * *